United States Patent
Curry et al.

(10) Patent No.: US 7,343,046 B2
(45) Date of Patent: Mar. 11, 2008

(54) SYSTEMS AND METHODS FOR ORGANIZING IMAGE DATA INTO REGIONS

(75) Inventors: Donald J. Curry, San Mateo, CA (US); Asghar Nafarieh, Menlo Park, CA (US); Doron Kletter, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 726 days.

(21) Appl. No.: 10/776,602

(22) Filed: Feb. 12, 2004

(65) Prior Publication Data
US 2005/0180647 A1   Aug. 18, 2005

(51) Int. Cl.
*G06K 9/00* (2006.01)
*G06K 9/34* (2006.01)
*G06K 9/62* (2006.01)
*G06K 9/46* (2006.01)
*G06K 9/54* (2006.01)

(52) U.S. Cl. .................... 382/243; 382/162; 382/173; 382/225; 382/232; 382/302

(58) Field of Classification Search ............... 382/128, 382/108
See application file for complete search history.

(56) References Cited

U.S. PATENT DOCUMENTS

| | | | |
|---|---|---|---|
| 4,849,914 A | 7/1989 | Medioni et al. | |
| 5,515,452 A | 5/1996 | Penkethman et al. | |
| 5,544,256 A * | 8/1996 | Brecher et al. | 382/149 |
| 5,577,135 A * | 11/1996 | Grajski et al. | 382/253 |
| 5,583,659 A | 12/1996 | Lee et al. | |
| 5,745,596 A | 4/1998 | Jefferson | |
| 5,900,953 A | 5/1999 | Bottou et al. | |
| 6,024,018 A * | 2/2000 | Darel et al. | 101/365 |
| 6,058,214 A | 5/2000 | Bottou et al. | |
| 6,115,031 A * | 9/2000 | Love et al. | 345/603 |

(Continued)

FOREIGN PATENT DOCUMENTS

EP    0 712 094 A2   5/1996

(Continued)

OTHER PUBLICATIONS

Queiroz et al, "Mixed raster content (MRC) model for compound image compression," Feb. 1999, SPIE, vol. 3653, pp. 1106-1117.*

(Continued)

*Primary Examiner*—Jingge Wu
*Assistant Examiner*—Max Shikhman
(74) *Attorney, Agent, or Firm*—Oliff & Berridge, PLC

(57) ABSTRACT

The image data is initially processed in a manner that is similar to that used to convert the image data into 3-layer mixed raster content format. After the image data is initially processed through a first stage of the three-layer segmentation process, rather than completing the segmentation into foreground and background planes, the image data is analyzed to identify regions having similar image characteristics. These regions are grouped together in cluster if they share color characteristics and are spatially close. The clusters are then sorted according to their size, and placed into a binary foreground plane based on one or more color characteristics. Each cluster gathered into a binary foreground plane having the same color as the color of the cluster.

16 Claims, 23 Drawing Sheets

U.S. PATENT DOCUMENTS

| | | | |
|---|---|---|---|
| 6,215,893 B1* | 4/2001 | Leshem et al. | 382/128 |
| 6,236,764 B1* | 5/2001 | Zhou | 382/266 |
| 6,324,305 B1* | 11/2001 | Holladay et al. | 382/239 |
| 6,343,154 B1 | 1/2002 | Bottou et al. | |
| 6,400,844 B1* | 6/2002 | Fan et al. | 382/173 |
| 6,529,202 B2* | 3/2003 | Wu | 345/593 |
| 6,633,670 B1* | 10/2003 | Matthews | 382/176 |
| 6,741,655 B1* | 5/2004 | Chang et al. | 375/240.26 |
| 7,079,675 B2* | 7/2006 | Hamer et al. | 382/128 |
| 7,145,676 B2* | 12/2006 | Fan | 358/1.15 |
| 2002/0027561 A1* | 3/2002 | Wu | 345/593 |
| 2002/0114512 A1* | 8/2002 | Rao et al. | 382/165 |
| 2003/0035580 A1* | 2/2003 | Wang et al. | 382/176 |
| 2003/0110181 A1* | 6/2003 | Schuetze et al. | 707/103 R |
| 2003/0198382 A1* | 10/2003 | Chen et al. | 382/173 |

FOREIGN PATENT DOCUMENTS

| | | |
|---|---|---|
| EP | 1 006 716 A2 | 6/2000 |
| WO | WO 02/056255 | 7/2002 |

OTHER PUBLICATIONS

Queiroz, "Mixed Raster Content (MRC) Model for Compound Image Compression", (1998), Proc. SPIE 3653, 1106-1117.*

R. De Queiroz, "Compression of Compound Documents," *IEEE*, Oct. 1999, pp. 209-213.

U.S. Appl. No. 10/187,499, filed Jul. 1, 2002, Curry et al.
U.S. Appl. No. 10/188,026, filed Jul. 1, 2002, Curry et al.
U.S. Appl. No. 10/188,249, filed Jul. 1, 2002, Curry et al.
U.S. Appl. No. 10/188,277, filed Jul. 1, 2002, Curry et al.
U.S. Appl. No. 10/188,157, filed Jul. 1, 2002, Curry et al.
U.S. Appl. No. 10/612,250, filed Jul. 1, 2003, Curry et al.
U.S. Appl. No. 10/612,057, filed Jul. 1, 2003, Curry et al.
U.S. Appl. No. 10/612,234, filed Jul. 1, 2003, Curry et al.
U.S. Appl. No. 10/612,461, filed Jul. 1, 2003, Curry et al.
U.S. Appl. No. 10/612,062, filed Jul. 1, 2003, Curry et al.
U.S. Appl. No. 10/612,261, filed Jul. 1, 2003, Curry et al.
U.S. Appl. No. 10/612,246, filed Jul. 1, 2003, Curry et al.
U.S. Appl. No. 10/612,368, filed Jul. 1, 2003, Curry et al.
U.S. Appl. No. 10/612,248, filed Jul. 1, 2003, Curry et al.
U.S. Appl. No. 10/612,063, filed Jul. 1, 2003, Curry et al.
U.S. Appl. No. 10/612,064, filed Jul. 1, 2003, Curry et al.
U.S. Appl. No. 10/612,084, filed Jul. 1, 2003, Curry et al.
U.S. Appl. No. 10/776,515, filed Feb. 12, 2004, Curry et al.
U.S. Appl. No. 10/776,514, filed Feb. 12, 2004, Curry et al.
U.S. Appl. No. 10/776,608, filed Feb. 12, 2004, Curry et al.
U.S. Appl. No. 10/776,612, filed Feb. 12, 2004, Curry et al.
U.S. Appl. No. 10/776,620, filed Feb. 12, 2004, Curry et al.
U.S. Appl. No. 10/776,603, filed Feb. 12, 2004, Curry et al.
U.S. Appl. No. 10/776,509, filed Feb. 12, 2004, Claassen et al.
U.S. Appl. No. 10/776,508, filed Feb. 12, 2004, Curry et al.
U.S. Appl. No. 10/776,516, filed Feb. 12, 2004, Curry et al.

De Queiroz et al., "Mixed Raster Content (MRC) Model for Compound Image Compression", 1998, pp. 1-12.

Zugaj et al., "A New Approach of Color Images Segmentation Based on Fusing Region and Edge Segmentation Outputs", 1998, pp. 105-113.

Said et al., "Simplified Segmentation for Compound Image Compression", 1999, pp. 229-233.

* cited by examiner

SYSTEMS AND METHODS FOR ORGANIZING IMAGE DATA INTO REGIONS

This invention is related to U.S. patent applications Ser. Nos. 10/776,515, 10/776,514, 10/776,608, 10/776,602, 10/776,620, 10/776,509, 10/776,508, 10/776,516 and 10/776,612, filed on an even date herewith and incorporated by reference in their entireties.

BACKGROUND OF THE INVENTION

1. Field of Invention

This invention is directed to organizing image data into regions having similar locations and color characteristics.

2. Related Art

Documents scanned at high resolutions typically require very large amounts of storage space. Furthermore, a large volume of image data requires substantially more time and bandwidth to manipulate, such as transferring over a local or wide area network, over an intranet, an extranet or the Internet or other distributed networks.

Documents, upon being scanned using a scanner or the like, are typically defined using an RGB color space, i.e., in raw RGB format. However, rather than being stored in this raw scanned RGB format, the document image data is typically subjected to some form of data compression to reduce its volume, thus avoiding the high costs of storing such scanned RGB document image data.

Lossless run-length compression schemes, such as Lempel-Ziv (LZ) or Lempel-Ziv-Welch (LZW), do not perform particularly well on scanned image data or, in general, image data having smoothly varying low-spatial frequencies such as gradients and/or natural pictorial data, while lossy methods such as JPEG, work fairly well on smoothly varying continuous tone image data. However, lossy methods generally do not work particularly well on binary text and/or line art image data, or, in general, on any high spatial frequency image data containing sharp edges or color transitions, for example.

SUMMARY OF THE DISCLOSURE

A new approach to satisfying the compression needs of data, such as the different types of image data described above, is to use an encoder pipeline that uses a mixed raster content (MRC) format to describe the data. The image data, such as for example, image data defining a composite image having text intermingled with color and/or gray-scale information, is segmented into two or more planes. These planes are generally referred to as the background plane and the foreground planes. A selector plane is generated to indicate, for each pixel in the composite image, which of the image planes contains the actual image data that should be used to reconstruct the final output image. Segmenting the image data into planes in this manner tends to improve the overall compression of the image, because the data can be arranged into different planes such that each of the planes are smoother and more readily compressible than is the original image data. Segmentation also allows different compression methods to be applied to the different planes. Thus, the most appropriate compression technique for the type of data in each plane can be applied to compress the data of that plane.

Unfortunately, some image document formats, such as the portable document format (PDF), do not currently fully support such three-layer mixed raster content decompositions of an original document. As a result, when attempting to print or otherwise render a document that has been compressed and stored as a mixed raster content image data file using such image document formats, the document either cannot be rendered at all, or contains objectionable artifacts upon rendering.

Systems and methods are provided for converting a document to a mixed raster content format having a plurality of binary foreground planes. After scanning the document, the image data is analyzed to identify regions, or blobs, using boundary continuity and/or color continuity. Each pixel is assigned an id that is only required to be unique inside a blob's bounding rectangle and a table is constructed that identifies the blobs by a bounding rectangle and pixel id and lists other attributes. The table is analyzed to sort and filter the blobs and cluster together blobs having similar locality and color characteristics. The clusters are then placed into one of a plurality of binary foreground layers. Each of the binary foreground layers is assigned a color value that approximates the average color of all blobs assigned to that layer. In this way, a high quality image can be rendered with acceptable color variation in the output image.

BRIEF DESCRIPTION OF DRAWINGS

The invention is described in detail, with reference to the following figures, wherein.

DETAILED DESCRIPTION

Various exemplary embodiments of systems and methods are disclosed that automatically process scanned and/or printed color documents to produce small, highly-compressed image data files that accurately capture the original document content. Data files are generated by scanning in documents, and analyzing the data to determine which pixels of the image can be grouped together because they have similar color and are defined by a closed curve boundary. These areas are then clustered together by combining areas of similar color which are near each other spatially. The combined areas (clustered regions) are then placed in one of a plurality of binary foreground layers, and may be compressed for output as a PDF file, for example.

Figure 1:
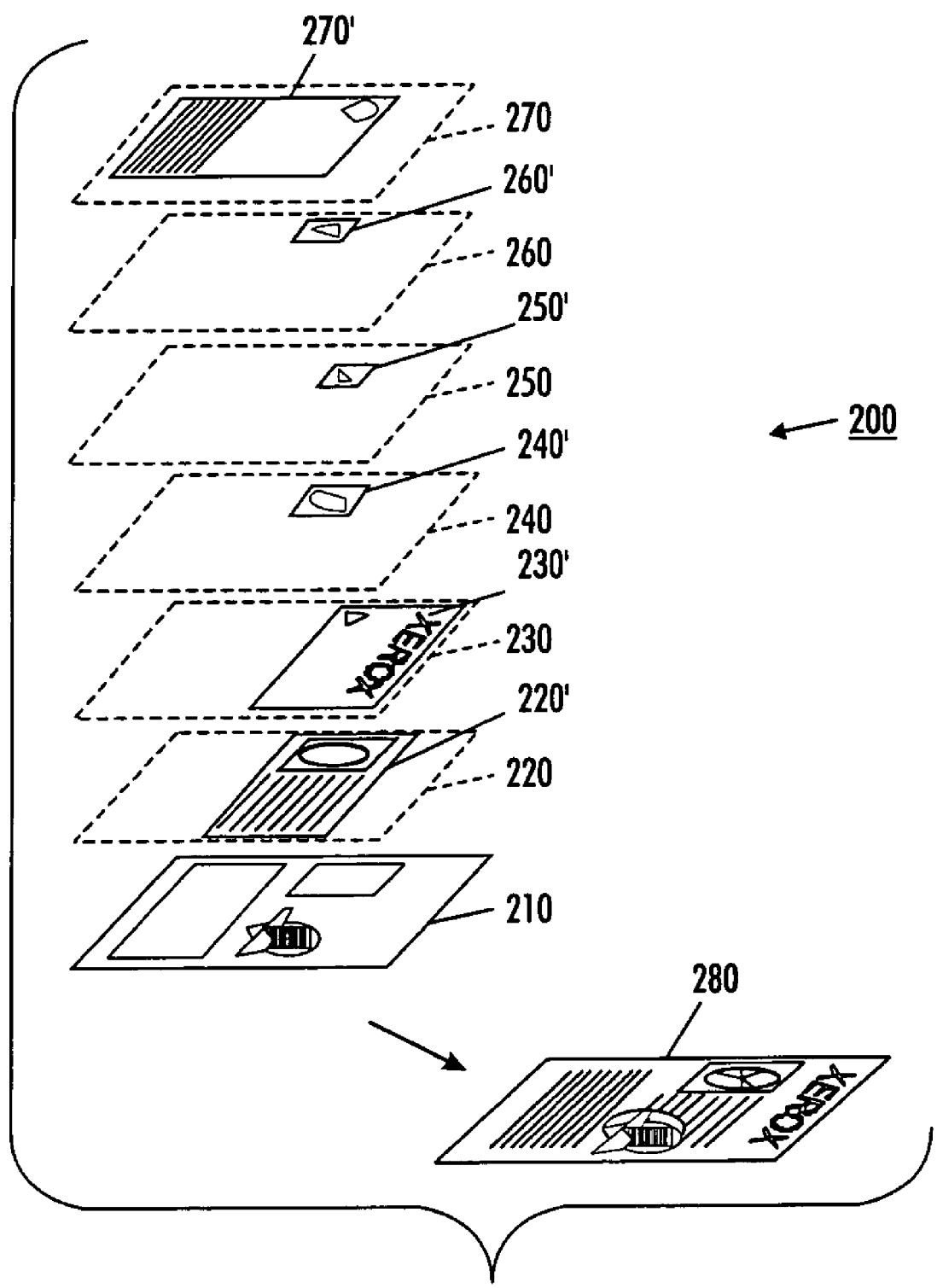
FIG. 1 illustrates an exemplary embodiment of an image decomposed into multiple binary foreground planes and a background plane.

FIG. 1 shows image data of a document that is decomposed into a background continuous tone or grayscale layer (background layer) 210 and N binary foreground layers. In this example, there are six (N=6) binary foreground layers 220-270. The image data contains low spatial frequency color data that are separated into six distinct color values. Each of the six color values is associated with a particular one of the multiple binary foreground layers 220-270 which include spatial extents of the regions 220'-270' that contain one of the six colors. Data not included in one of the regions 220'-270' remains in the background layer 210. Systems and methods will be described for generating the spatial regions 220'-270' that will each be assigned to a binary foreground layer.

An image data portion in any of the multiple binary foreground layers 220-270 does not overlap other image data portions in any of the other multiple binary foreground layers 220-270. As a result, each of the binary foreground layers 220-270 can be individually combined with the background layer 210 without regard to order or sequence. When all of the multiple binary foreground layers 220-270 are combined with the background layer 210, the reconstructed image 280 is obtained. Further processing of the binary planes might produce slightly better compression but require at least a partial ordering of the foreground planes.

Figure 2:
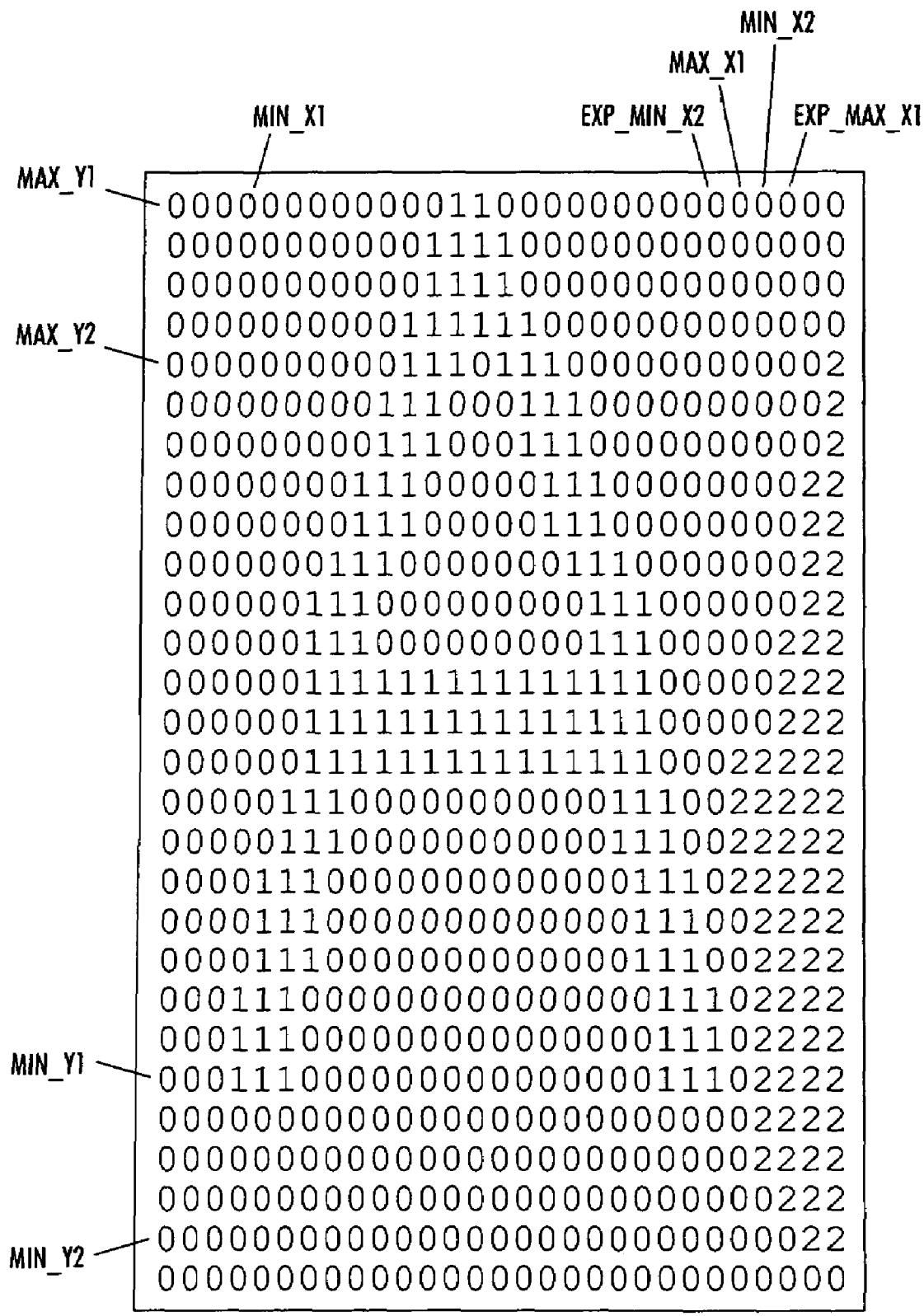
FIG. 2 illustrates one exemplary embodiment of blob ID image data.

The pixels in the image data may be identified as belonging to a "blob", which is a region defined by a closed curve boundary and containing pixels having a similar color value. A map of the image data may be made which assigns a non-unique small id to every pixel such that the id is unique only inside the bounding rectangle of the blob which is assigned the id. An alternative map of the image data may also be made, which assigns a unique id to each blob but the id size would then be required to be large enough to address all blobs. The following descriptions focus on using the small id (8 bit) map since it requires fewer resources at key points in the current implementation. An example of a blob ID image is shown in FIG. 2. The blob having the blob ID of "1" is shown as having roughly the outline of the shape of the letter "A". A parameter which is useful to describe a blob is a blob bounding box, which is the smallest rectangle that fully encloses the blob. A minimum value in the x-dimension, min_x1, a maximum value in the x-dimension, max_x1, and a minimum value of the y-dimension, min_y1, and a maximum value in the y-dimension, max_y1, define the extent of the blob bounding box for blob #1 in FIG. 2.

Blob #2 is another blob, bounded by min_x2, max_x2, min_y2 and max_y2. These two blobs may be clustered together by a blob cluster processing module. The cluster may then be assigned to one of the N-binary foreground layers, as will be described fully below.

Figure 3:
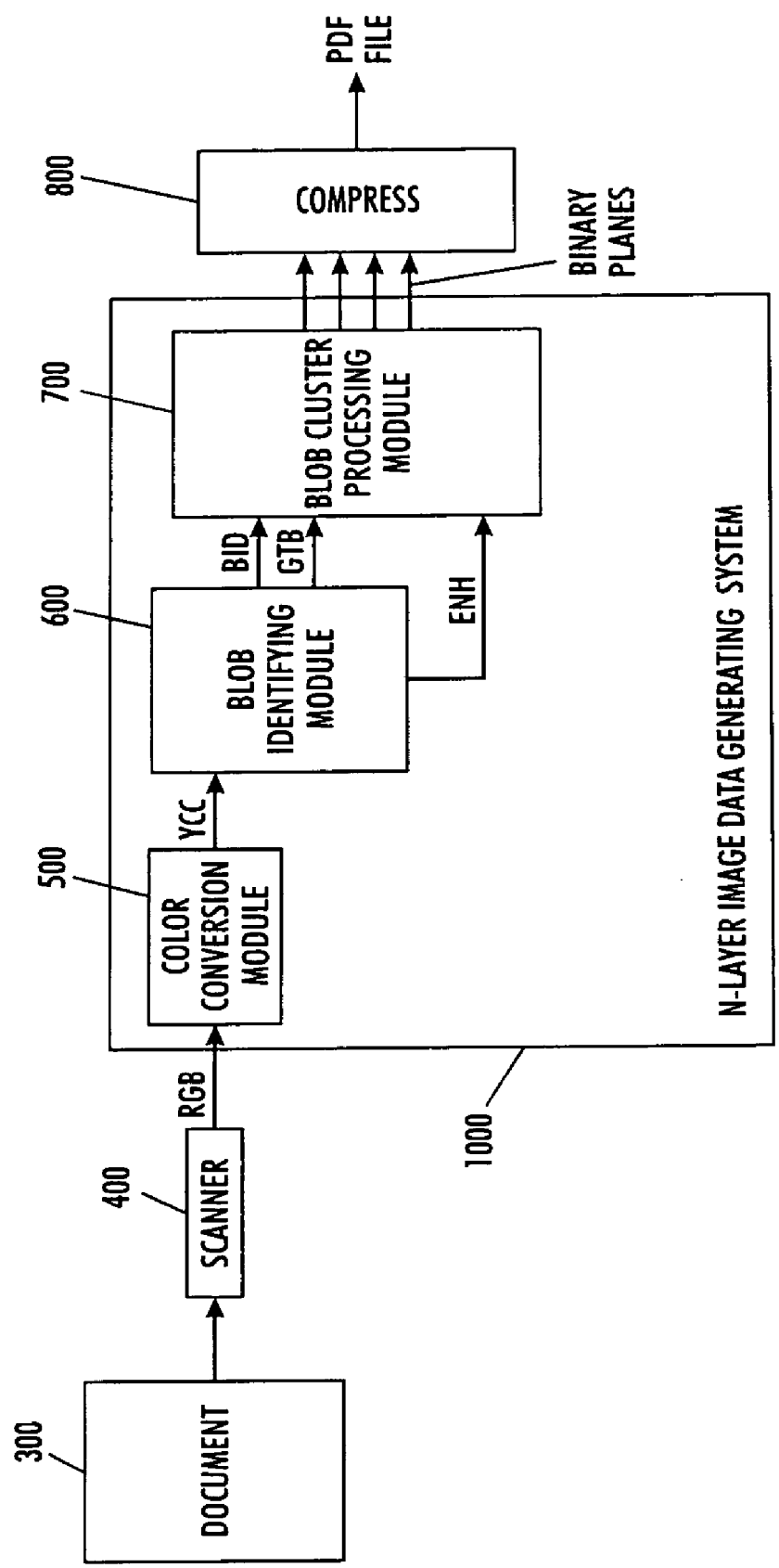
FIG. 3 illustrates one exemplary system in which the blob cluster processing module can operate.

FIG. 3 shows an exemplary system for generating the N binary foreground layers from a scanned document image. FIG. 3 shows a document 300, being scanned by a scanner 400 to generate image data in, for example, an RGB color space, and the image data is input to the N-layer image data generating system 1000. The N-layers produced by the N-layer image data generating system 1000 are then compressed by compress module 800 and output as a PDF file, for example.

The first module in the N-layer image data generating system 1000 is the color conversion module 500. The color conversion module 500 may convert the RGB data to a YCC color space, for example. As is well known, the YCC color space includes a luminance component (Y) and two chroma components (CC). The chroma components may be subsampled at a 2:1 ratio, at least in one direction if not in both, so that there are half as many data points in the chroma components as there are in the luminance components. Other color spaces, such as Lab may also be used.

The image in the YCC color space may then be input to a blob identifying module 600 which generates a list of the regions, or blobs, appearing in the image. The blobs are identified based edge continuity and color characteristics. Blobs are regions having a continuous boundary, which encloses pixels having nearly the same color value. The blob identifying module 600 assigns a blob ID to each pixel in the image, indicating to which blob, if any, the pixel belongs. Pixels which do not belong to blobs are assigned to a background layer. A map of the blob IDs for each pixel location is a blob identification (blob ID) image, and is generated by the blob identifying module 600.

Figure 4:
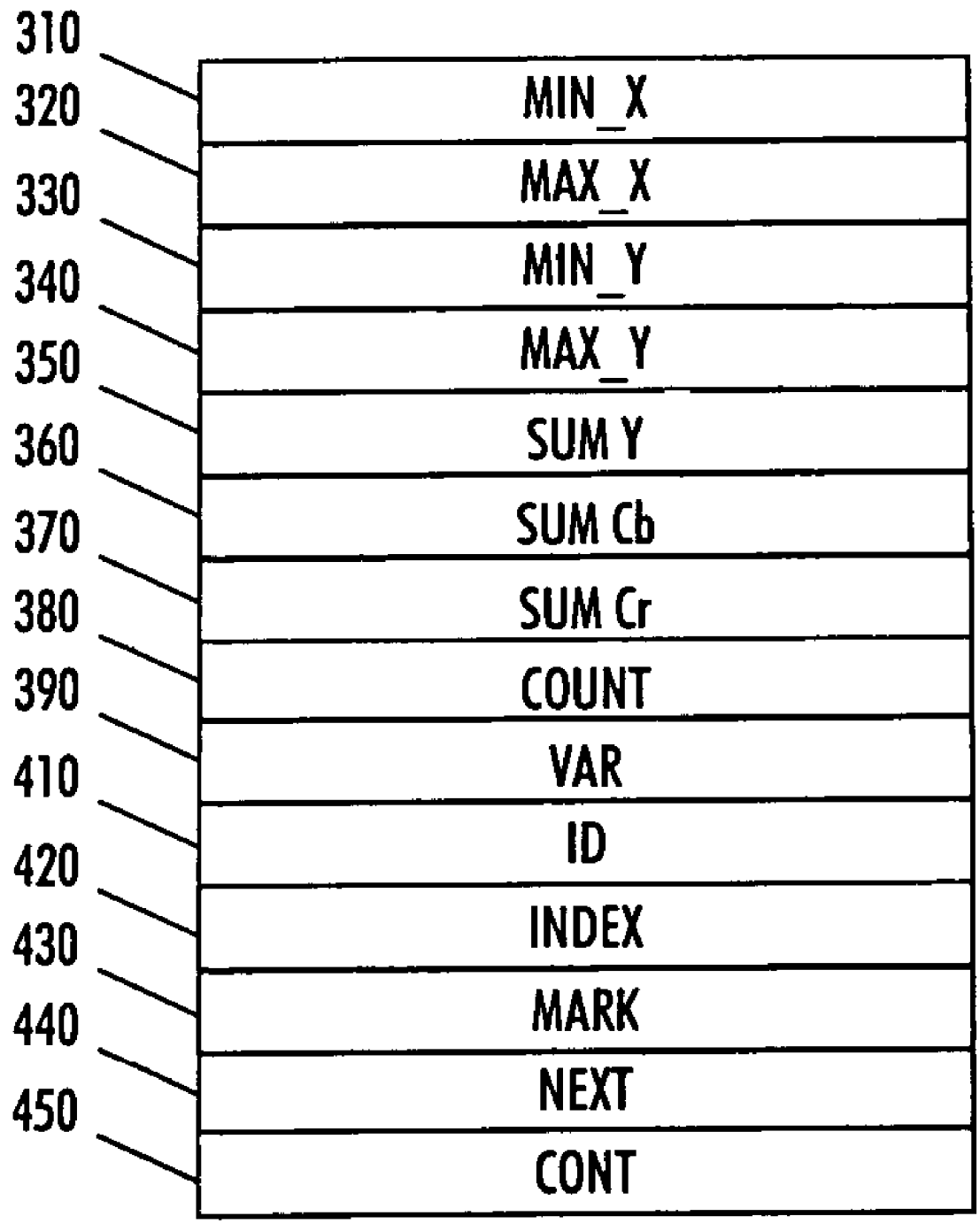
FIG. 4 illustrates one exemplary embodiment of an entry for a blob or cluster in a global table of blobs.

The blob identifying module 600 also generates a global table of blobs (GTB) which is a list of all blobs found in the document image 280. A single entry in the GTB is shown in FIG. 4. The GTB contains as many blob entries as there are blobs. The first four fields 310-340 of each GTB entry are the coordinates of the bounding box associated with the blob. The row and column location of the blob as a whole is determined by the min_x, max_y (top-left corner) of the bounding box. The bounding box is used by the blob cluster processing module 700, to determine if blobs are near each other, and to combine those blobs which are spatially nearby.

The luminance 350 and chroma values 360 and 370 are color sums assigned to a blob; the total pixel count 380 is the total number of pixels in the blob ID image which have been assigned to a given blob (For example, the total pixel count for blob #1 in FIG. 2 is 163.); the optional var value is the variance in the chroma values for the blob; the ID field 410 is the (non-unique) blob ID used in the map image; the index field 420 is an optional unique blob identifier. A mark field 430, included with each GTB entry, stores marks applied to the blob by the blob cluster processing module, according to whether the blob passes a set of test criteria, as will be discussed further below. The blob next field 440 and cont field 450, store pointers indicating blobs to which the current blob is linked.

Also generated by the blob identifying module is the enhanced color data (ENH), which is the scanned, YCC-converted image. The data in the ENH is "enhanced" because the edge features of the blobs have been enhanced, based on the contrast of the surrounding pixels. The ENH, along with the GTB and the blob ID map image, are the inputs to the blob cluster processing module 700.

The blob cluster processing module 700 inputs the blob ID map image, the GTB, and the ENH, analyzes the global table of blobs, and combines those blobs which share certain color and spatial characteristics into N clustered regions. The blob cluster processing module 700 assigns the clustered regions to one of N+1 binary foreground layers, depending on the color value of the clustered region. The first layer (layer 0) is the selector layer, which is obtained by OR-ing layers 1 through N. The remaining layers 1 through N contain the N-layer information. The layers are then compressed by the compression module 800 before being output in, for example, a PDF format.

Figure 5:
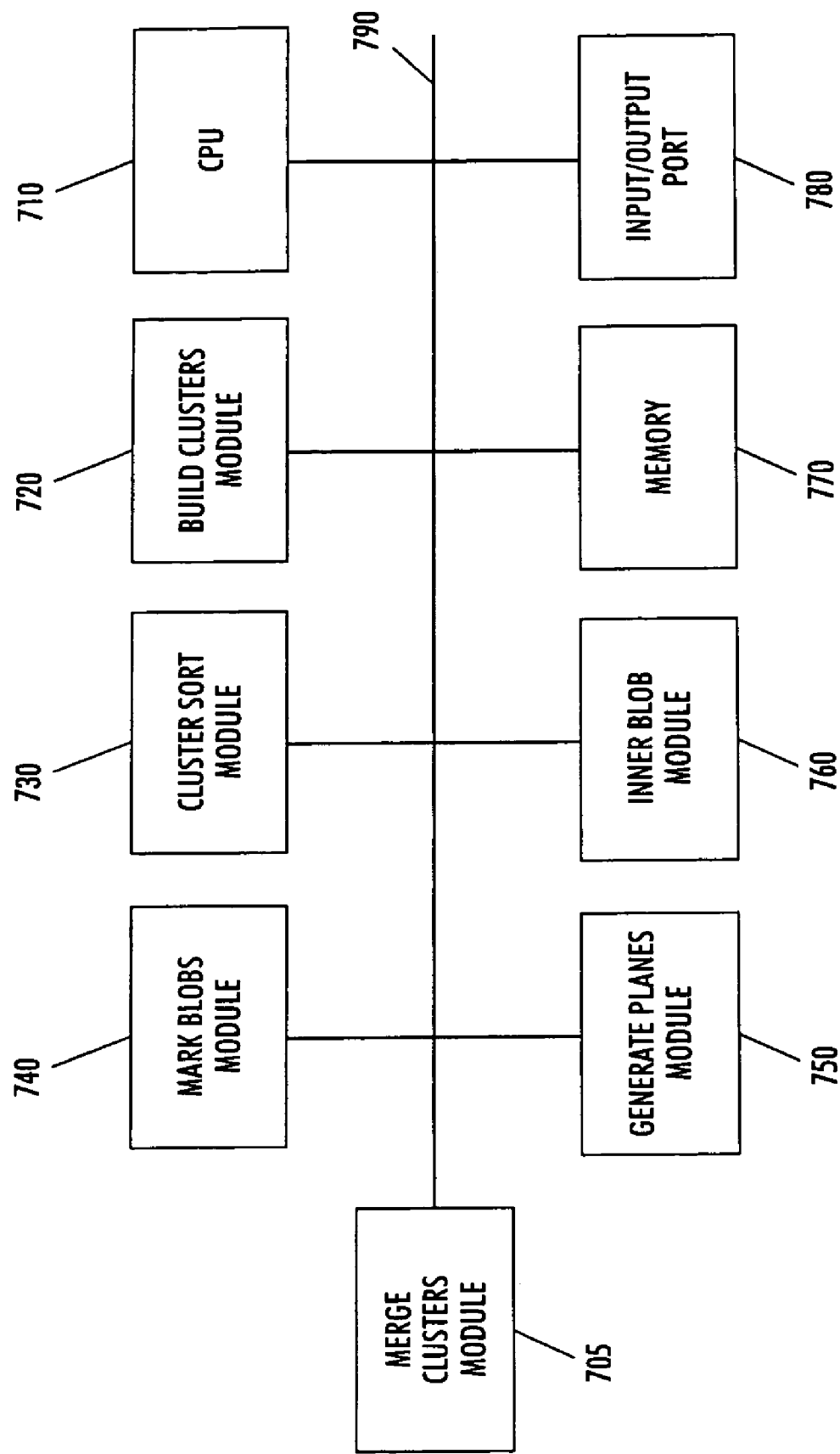
FIG. 5 illustrates one exemplary embodiment the blob cluster processing module of FIG. 3.

FIG. 5 shows an exemplary embodiment of the blob cluster processing (BCP) module 700, that includes a CPU 710, an input/output port 780, a memory 770, a build clusters module 720, a cluster sort module 730, a mark blobs module 740, a generate layers module 750, a merge cluster module 705, and an inner blob module 760. The above components 710-780 may be coupled together via a bus 790. While the blob cluster processing module 700 is illustrated using a bus architecture diagram, any other type of hardware configuration may be used such as using application specific integrated circuits (ASICs) to implement one or more of the components, or writing a computer program that executes in the CPU 710 to perform all the functions of the blob cluster processing module 700.

The blob cluster processing module 700 inputs the ENH, the blob ID map data (BID) and the GTB through the input/output port 780 from the blob identifying module 600, and generates the N+1 binary foreground layers. The input data may either be stored in total in memory 770, or as much as needed may be stored for processing the data on the fly.

Upon receiving the GTB from the blob identifying module 600, the cluster sort module 130 sorts the blobs to place them in an order which is convenient for subsequent blob cluster processing stages. The sorting may be accomplished 'in place' by swapping table record contents in GTB. The cluster sort module 730 sorts the blobs by vertical position (slow scan) order first, then horizontal position (fast scan). The cluster sort module 730 sorts the blobs based on the top-left corner of the blob bounding-box. The blobs may be sorted sequentially, by line number, according to which line the top-left corner of the bounding box is located on, unless two or more blobs fall on the same line, in which case they may be sorted according to which blob bounding box falls on the leftmost pixel.

The cluster sort module 730 also normalizes the color sums in the GTB, by dividing the color sum by the pixel count, to obtain an average blob color. The normalization is done with rounding to the nearest integer. After obtaining an accurate value for the average blob color, the blob pixel count is adjusted to be less than or equal to a predefined upper limit. This last step prevents arithmetic overflows in subsequent steps in the case of very large blobs. After this point in the processing, the count is only used to determine the weight of a blob for the purpose of computing an average for a cluster of blobs.

The sort module 730 then passes the GTB to the mark blobs module 740. The mark blobs module 740 analyzes each blob in the GTB, and applies a mark to the nark field 430, depending on the results of a number of test conditions. The mark field 430 was initialized to zero by the blob identifying module 600, at the creation of the GTB. The purpose of marking the blobs is to indicate which blobs may be eliminated by downstream processes, in order to reduce the number of blobs, and therefore reduce the processing burden. Thus, the mark field 430 is used by the marking process to achieve the process burden reduction purpose.

The mark blobs module 740 tests the blobs according to five different conditions. If the conditions are met, the bits in the mark field are changed to mark the blob. Each condition leads to a different bit pattern in the mark field. In order to expedite the process, simple tests are used based on the bounding box instead of the exact blob shape. The mark blobs module 740 conditions are applied in the following order:

1) Check if the blob area is too small.
2) Check if the pixel count density is smaller than a predefined minimum density.
3) Check if the aspect ratio (width/height) of the bounding box is too large or too small. This condition may indicate that the blob is a line.
4) Check if the bounding box width or height is too large.
5) Check if the blob area is sufficiently large and the average luminance is close to white.

Some of the bits of the mark field 430 are set according to the results of the applied test conditions, listed above. Other bits may be set at a later time. The order of the test conditions represents the order of increasing importance. Upon completion, the mark field 430 contains the code from the last test that was met. A blob will remain unmarked (code 0) only if all the five tests failed.

The mark blobs module 740 does not remove nor change any blobs, but only alters the mark field when one or more of the test conditions is satisfied. Subsequent modules may detect one or more of the above mark codes to eliminate marked blobs. In addition, subsequent steps may change or add other marked codes.

The mark blobs module 740 further tests to determine if the color of a blob has a variability which falls within certain predefined limits. If not, the blob is marked accordingly. Only blobs which have at least a minimum pixel count (of at least, for example, 500 pixels) and which have not yet been marked by the mark graphics module, are inspected for color variability.

Figure 6:
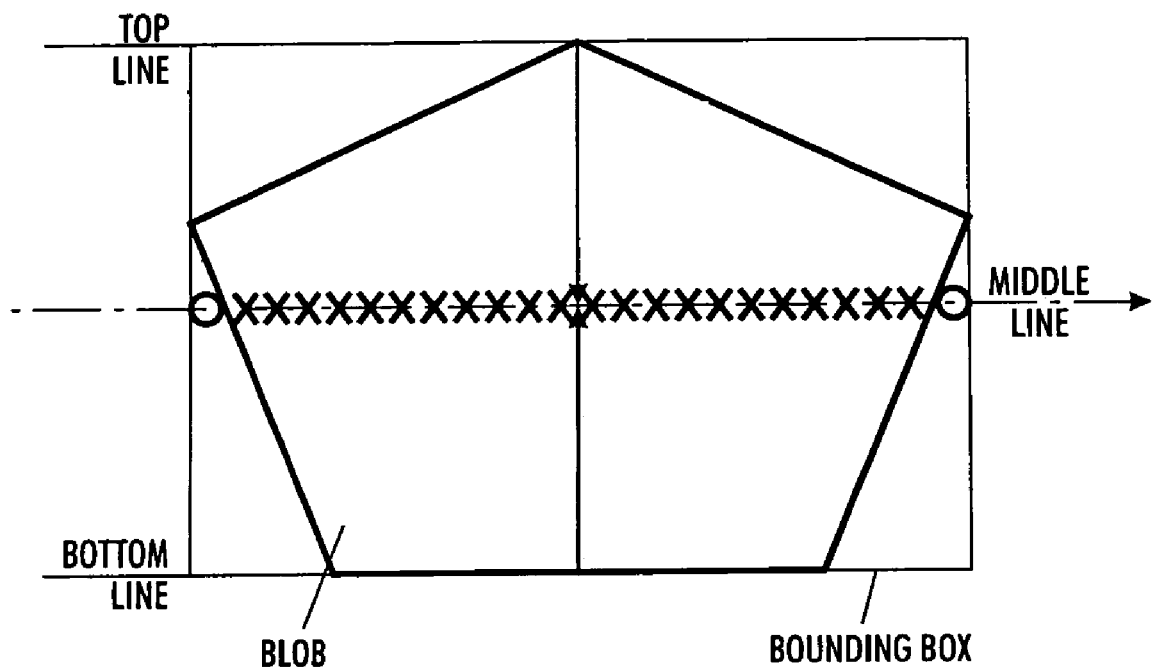
FIG. 6 illustrates an exemplary embodiment of a bounding box.

While all or a large portion of the pixels in a blob may be used for the color variability test, to increase the speed of the color variability test, only the pixels located on a single line, such as the middle line, may be tested, as shown in FIG. 6. The middle line for each blob is determined by averaging the top and bottom lines of the blob bounding box, and rounding to the nearest integer. The mark blobs module 740 evaluates the blob pixels on the middle line, starting from the first blob pixel on the left and ending in the last blob pixel on the right as determined by the bounding box. The mark blobs module 740 then inspects the color variation of the blob pixels on the middle line.

For each pixel on the middle line that belongs to the current blob as indicated by the blob ID image, the pixel chroma values are fetched from the enhanced color data ENH. As illustrated by FIG. 6, only pixels marked as "X" are used. The pixels marked "O" are not part of the current blob, and therefore are not used. The mark blobs module 740 calculates the color variation by measuring the chroma difference between the current "X" pixel color and the average blob chroma, given by the Cb, Cr color sums. For each "X" pixel, the chroma-squared contributions are added together:

$$SUM=(ENH1(\text{pixel})-ave[1])^2+(ENH2(\text{pixel})-ave[2])^2 \qquad (1)$$

where ENH1 and ENH2 are the pixel chroma component values (Cb, Cr), and ave[1] and ave[2] are the blob average chroma values (Cb, Cr), respectively.

At the same time, the number of "X" pixels (belonging to the current blob on the middle scanline) is counted. After the last pixel on the middle line is encountered, the accumulated chroma-square variance calculated according to Eq. (1) is normalized by the pixel count.

The mark blobs module 740 then compares the calculated chroma-square variance against a predefined limit. If the chroma-square variance exceeds this limit, the blob is marked accordingly. The mark blobs module 740 then proceeds to check the next blob in the global table of blobs. The process repeats until the last blob is inspected.

After the blobs are marked, they are clustered to combine those blobs having similar color characteristics and nearby in location. Since each cluster will eventually be assigned to its own binary foreground plane, the build clusters module 740 seeks to consolidate as many blobs as possible into as few clusters as possible. The build clusters module 720 organizes the sorted and marked blobs into clusters, based on their color and spatial relationships.

Figure 7:
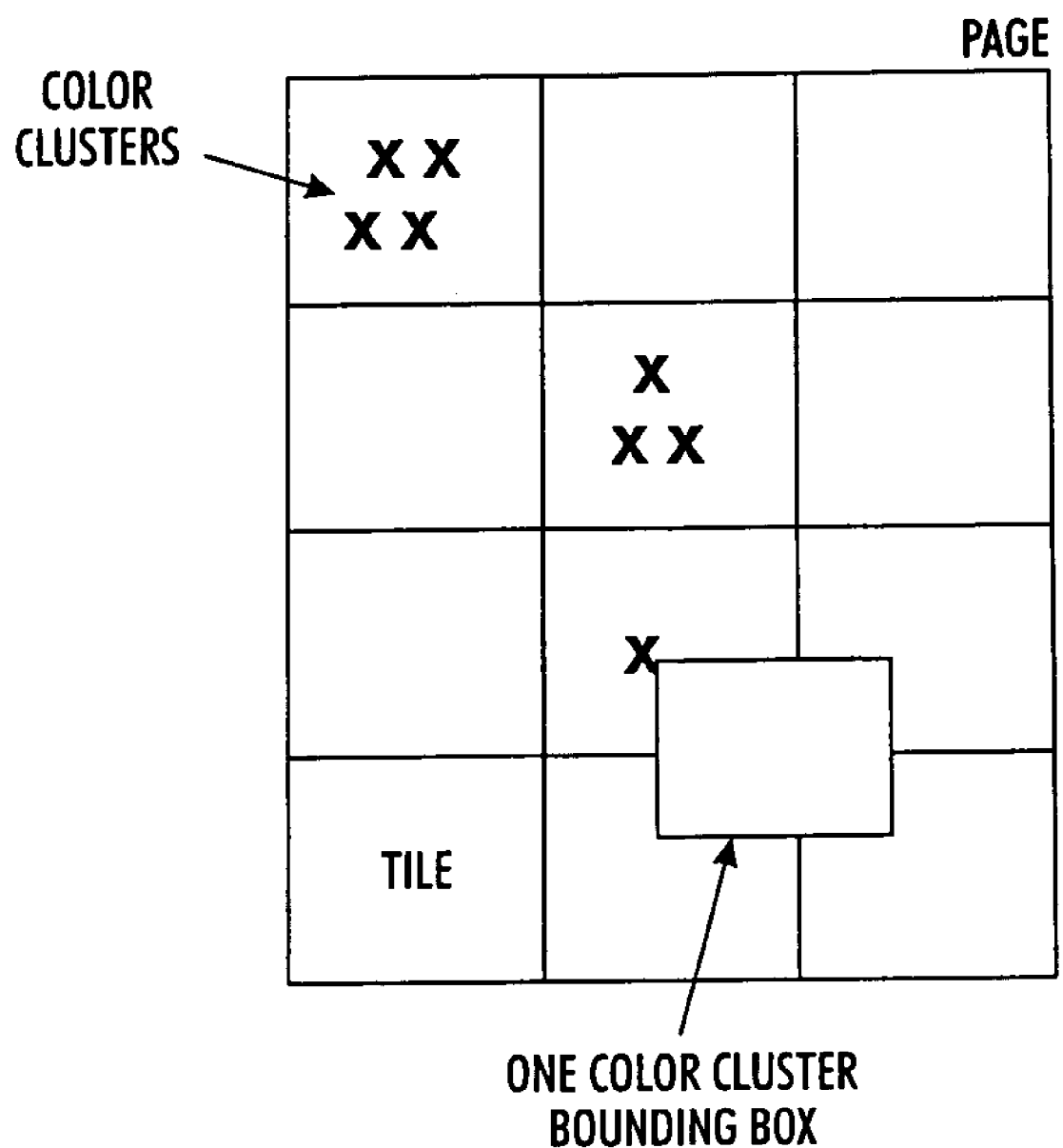
FIG. 7 illustrates how a page of image data can be divided into a plurality of tiles.

The build clusters module 720 begins by dividing the image area into adjacent and non-overlapping square tiles. The purpose of the tiles is to reduce the image area being evaluated into a more manageable size. The tile size is programmable (for example, 256×256 pixels). For convenience, the tile size is restricted to be a binary power of two. The image area and tile relationship is illustrated in FIG. 7. The build clusters module determines the number of tiles on the image area by dividing the image area width and height by the tile size (adding 1 to round up to the next integer).

The build clusters module 720 groups blobs by color and spatial location, to form color clusters and spatial clusters of blobs. Each color cluster contains one or more blobs which are similar in color, i.e., the regions are different in color by an amount less than a color threshold. The color threshold may be defined in terms of the square of the difference in luminance between the blobs, or the chroma-squared difference, as is well known in the art. Each color cluster contains at least one spatial cluster, and each spatial cluster contains at least one blob. If a color cluster contains multiple spacial clusters, they must all be close in color. If a spatial cluster contains multiple blobs, the blobs must be near each other.

To determine whether a blob should join a spatial cluster, an expanded bounding box is used. The purpose of the expanded bounding box is define an exceptable distance threshold between blobs which are still to be considered to be in the same spatial cluster. Blobs which have overlapping expanded bounding boxes are considered to be close enough to each other to belong to the same spatial cluster. An aggregated bounding box is associated with the spatial clusters, which includes the expanded bounding boxes of all the blobs contained in the cluster. As additional blobs are added to the cluster, the aggregated bounding box of the spatial cluster is adjusted to include expanded bounding box of the additional blob.

Figure 8:
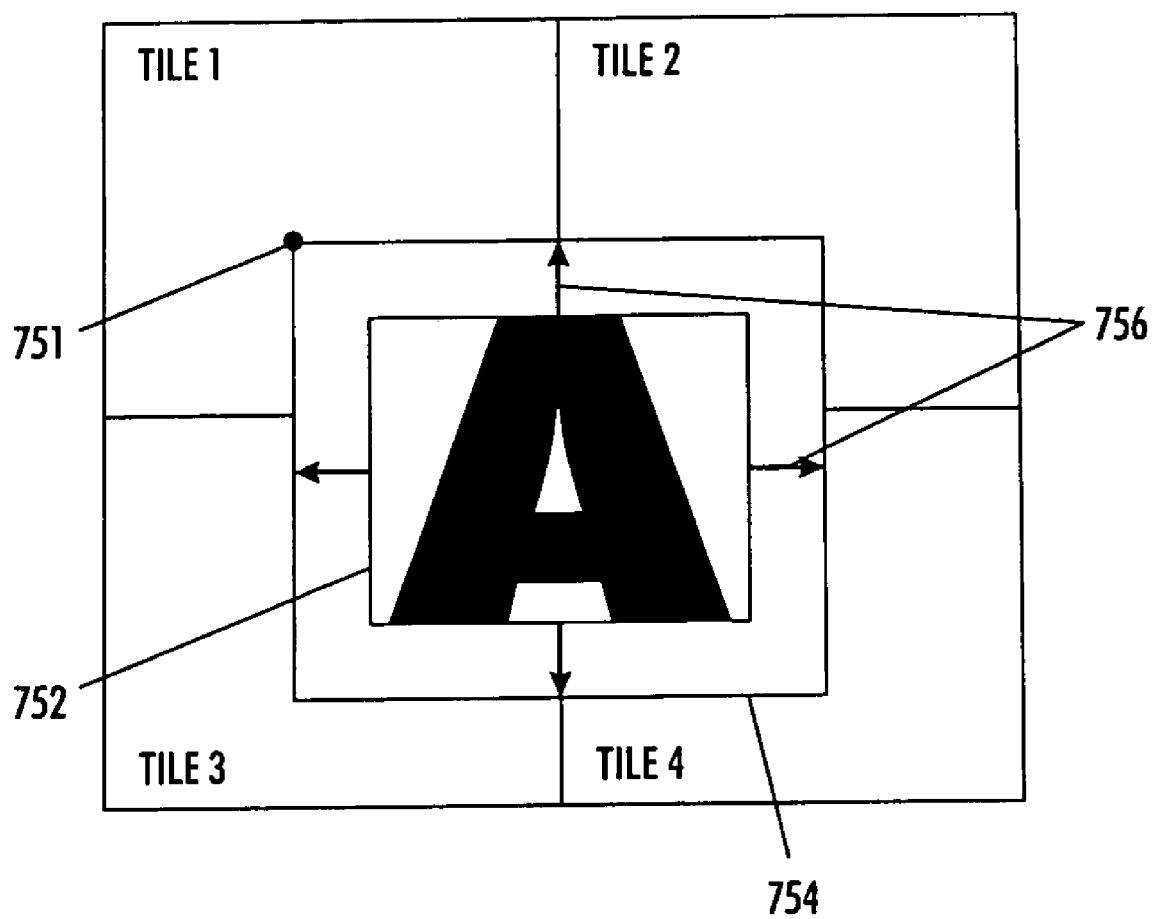
FIG. 8 illustrates one exemplary embodiment of an expanded bounding box.

An example of an expanded bounding box is shown in FIG. 8. The expanded bounding box 754 is expanded proportionally to the original bounding box 752 width and height, up to a predefined limit. The expanded width 756 is calculated by adding a programmable fraction of the original width on each side. Likewise, the expanded height is calculated by adding a programmable fraction of the original height from above and below. In either case, the amount of expansion is limited by another parameter (by, for example, no more than 60 pixels on each side).

For example, returning to FIG. 2, the blob identified as blob "1" (the letter "A") has an expanded bounding box that is expanded by two columns in the x-direction, giving expanded bounding box boundaries of ex_max_x1. Similarly, blob #2 is also expanded by two columns, giving expanded bounding box boundaries ex_min_x2. Therefore, blob #1 included in the same spatial cluster with the blob identified as blob "2", if there color values are sufficiently close, because the expanded bounding box of blob "1" (exp_max_x1) overlaps that of blob "2" (exp_min_x2).

The size of the expansion of the bounding box is chosen based on a tradeoff between the resulting number of binary foreground layers, and the compression efficiency of the binary layers. As larger expanded bounding boxes are used, blobs which are separated by a larger extent will be joined together by the blob cluster processing module, so that fewer foreground layers are needed to reproduce the image. However, the efficiency of the compression of the binary layer having widely spaced blobs, will suffer. Although the expanded bounding box 754 spans all four tiles on this segment of the image, the position of the top-left corner 751 of the expanded bounding box 754 determines the tile to which the initial clusters belong. Thus the blob of FIG. 8 will be initially be included in clusters in tile 1.

To keep track of the contents of the clusters as they are assembled from the blobs, the build cluster module 720 maintains two levels of cluster data rooted at each tile. For instance, if the blob of FIG. 8 is the first blob for tile 1, tile 1 will contain one color cluster which will contain one spatial cluster which will contain the blob. The expanded bounding box of the spatial cluster will be the expanded bounding box of the blob. Also, the color of both the spatial and color clusters will be the same as the blob. The cluster data structure uses the same record type as a blob (FIG. 4). Field use is slightly different in that where the cont (content) field for a blob is always empty, the cont field of a spatial cluster always points to the head of a blob list and the cont field of a color cluster always points to the head of a spatial cluster list.

The next field points to the next record in a list. The next field of a blob points to a blob. The next field of a spatial cluster points to a spatial cluster. And the next field of a color cluster points to a color cluster. The next field is NULL at the end of a list. An exemplary data structure used by the build cluster module 720 is shown in FIG. 9.

Figure 9:
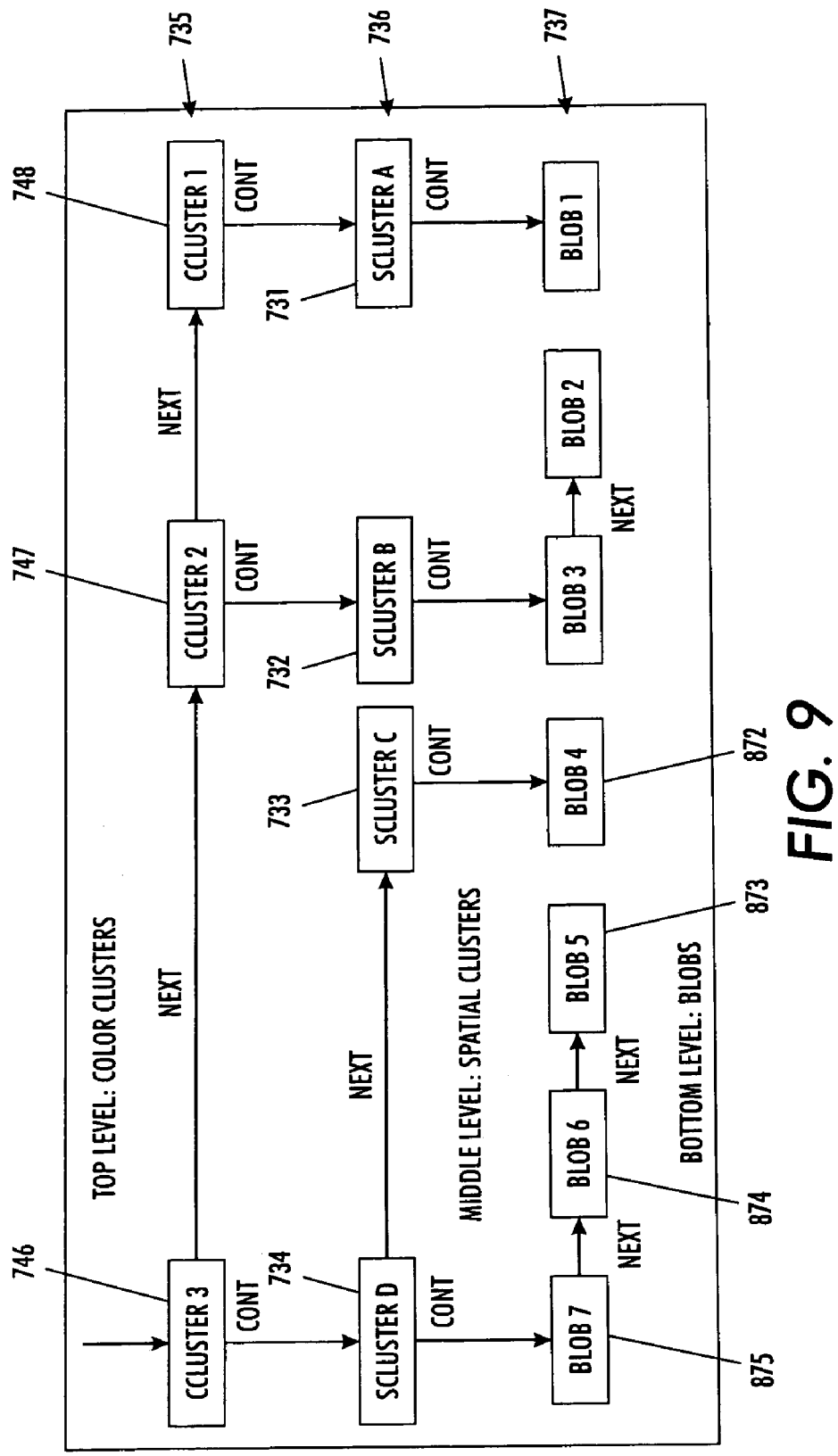
FIG. 9 illustrates one exemplary embodiment of the data structures for describing clusters of blobs according to their spatial and color relationships.

FIG. 9 shows a three level data structure, which is used to track each of the blobs as they are incorporated into clusters. The top level 735 of the data structure contains the color clusters 746, 747, and 748, for example. Color clusters are groupings of spatial clusters which have the same or a similar color, as compared to a predefined color threshold, such as, for example, 20. The second level 736 of the data structure contains the spatial clusters 731, 732, 733 and 734, which contain blobs that have overlapping extended bounding boxes. Blobs that have similar color and whose corresponding expanded bounding boxes overlap are clustered together by linking the blobs together under a single spatial cluster. The spatial cluster cont field points to, that blob list. Therefore, spatial cluster 734 contains blob 874, which is in turn linked to blob 873 and 872 by a next pointer.

The bottom level 737 contains the original blobs linked to the spatial clusters by a cont pointer and to blobs within the same cluster by next pointers. Thus, each cluster or blob is linked to other clusters or blobs in the same level using a "next" pointer, and the clusters are linked to other clusters on a lower level by the "cont" pointer. Therefore, the "next" pointer links a chain of clusters or blobs, and the "cont" pointer links contents of a cluster or blob. All cluster lists may use the same basic data structure.

The build clusters module 720 processes the blobs from the GTB, one blob at a time, and each blob from the list in turn becomes the "current" blob for the purposes of the following discussion. The coordinates of the top-left bounding-box corner for the current blob is retrieved from the GTB entry, and used to determine the corresponding tile number by dividing the coordinates by the tile size.

The first blob found in each tile initiates new cluster chains, to which subsequent blobs will be linked. The tile entry identifies the tile to which the cluster belongs. The blob data from the blob entry in the GTB, including number of pixels, luminance and chroma, may be copied into new color and spatial cluster records. The new clusters bounding boxes are computed by expanding the blob bounding-box. The color cluster cont field will point to the spatial cluster and the spatial cluster cont field will point to the blob.

The next blob found in the tile can either be assigned to an existing spatial cluster, or a new cluster may be created to contain it. For example, if the current blob 872 is determined not to match any already created color cluster, a new color cluster 846 is created in the cluster list, and inserted at the beginning of the color cluster chain.

Figure 10:
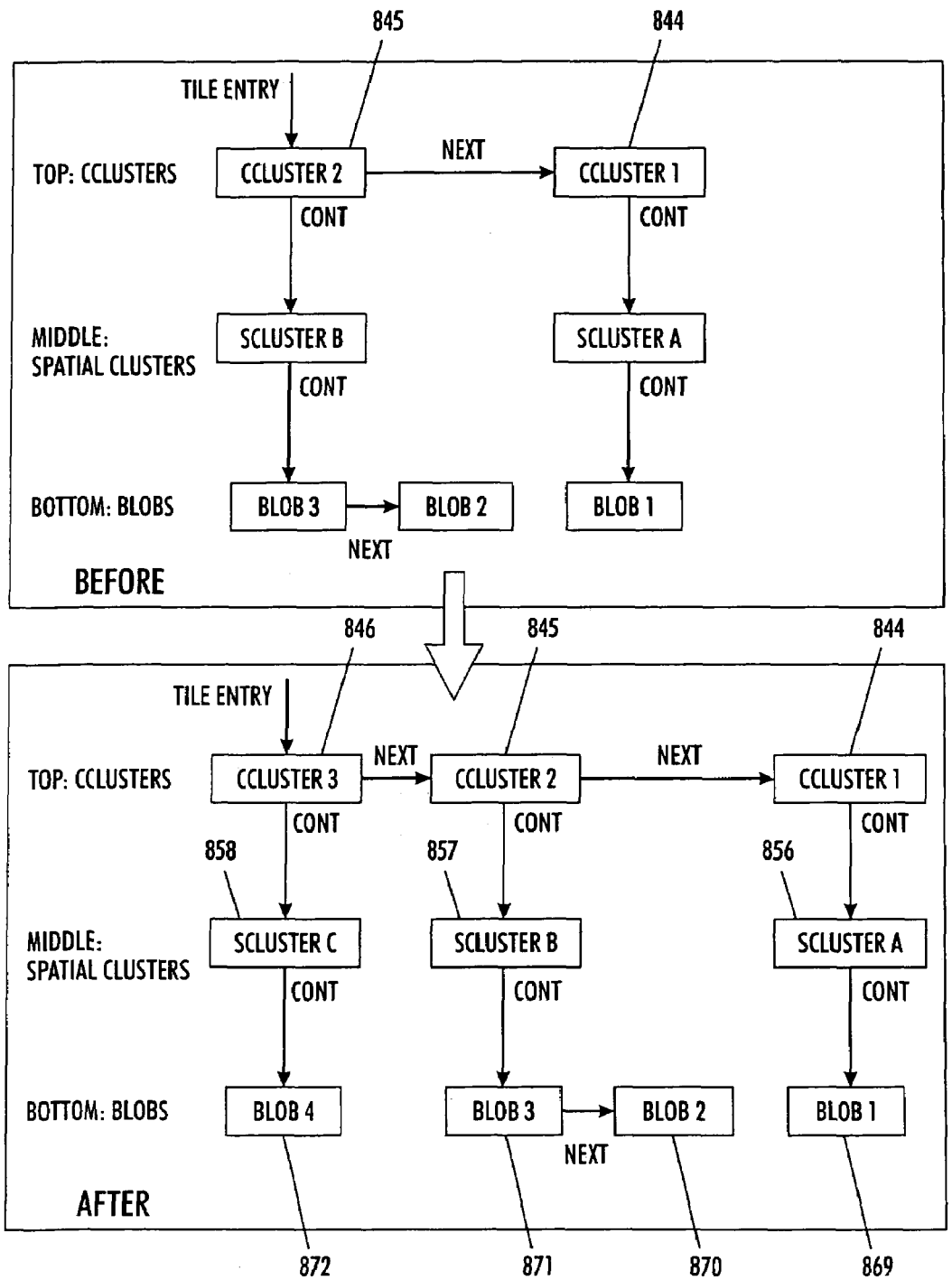
FIG. 10 illustrates how a new cluster is inserted at the beginning of the cluster chain by the build clusters module of the blob cluster processing module of FIG. 4.

FIG. 10 illustrates the procedure for inserting a new color cluster 846 into the cluster chain already containing 845 and 844. To insert a new color cluster, the cluster index in the corresponding tile entry previous to the insertion of the new color cluster, is copied into the next field of the new color cluster, and the tile entry is modified to contain the index of the new color cluster. This effectively adds the current cluster 846 at the beginning of the chain.

Since newly added cluster 846 is a top-level 735 color cluster, the next two levels 736 and 737 also need to be established at this time. The color cluster 846 cont field is set to point to new spatial cluster 858 created at level 736.

Finally, the blob level 737 of the cluster array is updated by linking the newly established spatial blob 858 with the current blob 872. As indicated above, when the new spatial and color clusters 858 and 846 are created, there is only one associated blob. However, later on additional blobs or clusters may be added if they are closely matching in color and they meet the spatial overlap.

As can be seen from FIG. 10, the newly added color cluster 846 is entered at the beginning of the chain for the tile in which it is located. All three levels 735-737 are created and linked together via the cont and next pointers. Initially, the content of the three levels 735-737 is nearly identical (except for the expanded bounding boxes for the top two levels 735 and 736, and different cont and next pointers). However, later on additional blobs may be added, if a color match and spatial match are found, and then the clusters will begin to accumulate the average color and aggregated bounding boxes, as further described below.

Figure 11:
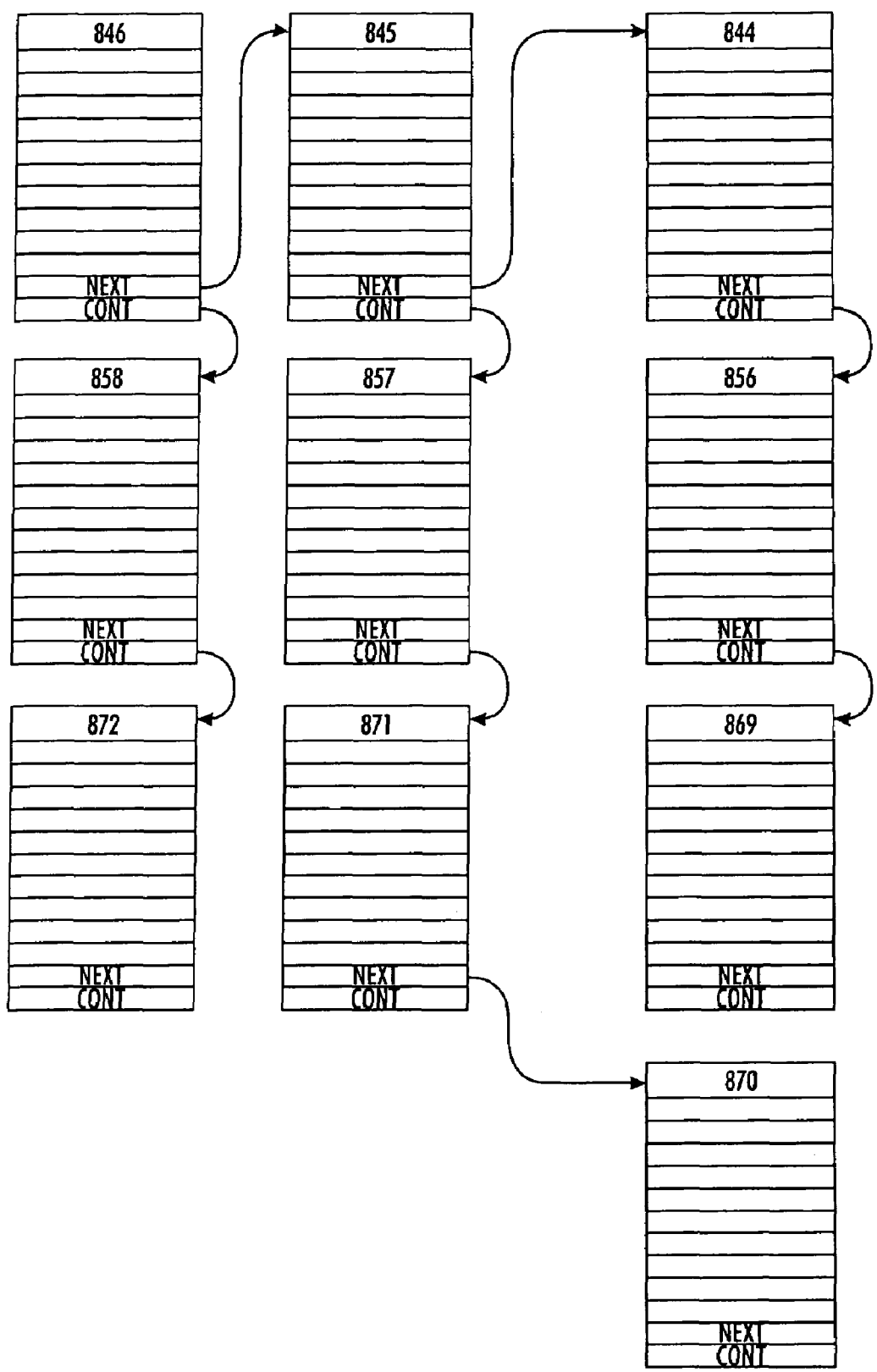
FIG. 11 illustrates a cluster table entry with the next and cont linking fields.

FIG. 11 shows an exemplary diagram of linked cluster entries from the cluster data structure. The cluster entries are those corresponding to the clusters shown in the lower portion of FIG. 10. Cluster 846 is linked to cluster 845 via its next pointer, and cluster 845 is linked to cluster 844 via its next pointer. Cluster 846 is also linked to cluster 858 via its cont pointer, and cluster 858 is linked to cluster 872 via its cont pointer. Cluster 857 is linked to cluster 871 via its cont pointer, and cluster 871 is linked to cluster 870 via its next pointer. Finally, cluster 844 is linked to cluster 856 via its cont pointer, and cluster 856 is linked to cluster 869 via its cont pointer.

If two color clusters have color values which fall within the color threshold, or two spatial clusters have overlapping extended bounding boxes, they may be merged. The merging includes the updating of average color and pixel count. The equations used to update these values are:

$$cnt = cnt1 + cnt2 \quad (2)$$

$$Y1 = (Y1*cnt1 + Y2*cnt2)/cnt \quad (3)$$

$$Cb1 = (Cb1*cnt1 + Cb2*cnt2)/cnt \quad (4)$$

$$Cr1 = (Cr1*cnt1 + Cr2*cnt2)/cnt \quad (5)$$

$$\text{if } (cnt1 > MaxCount), \text{ then new } cnt1 = MaxCount \quad (6)$$

where Y1, Y2, Cb1, Cb2, Cr1, Cr2 are the luminance and chrominance values, and cnt1 and cnt2 are the pixel counts. The two extended bounding boxes are combined producing a bounding box which bounds both. Finally, any content lists pointed to by the cont fields of the two clusters are combined by appending one to the other and this combined list will be pointed to by the new cont field. If the two clusters being merged are already in the same list, the one must be removed from the list and the other can be used to contain the merged data.

Figure 12:
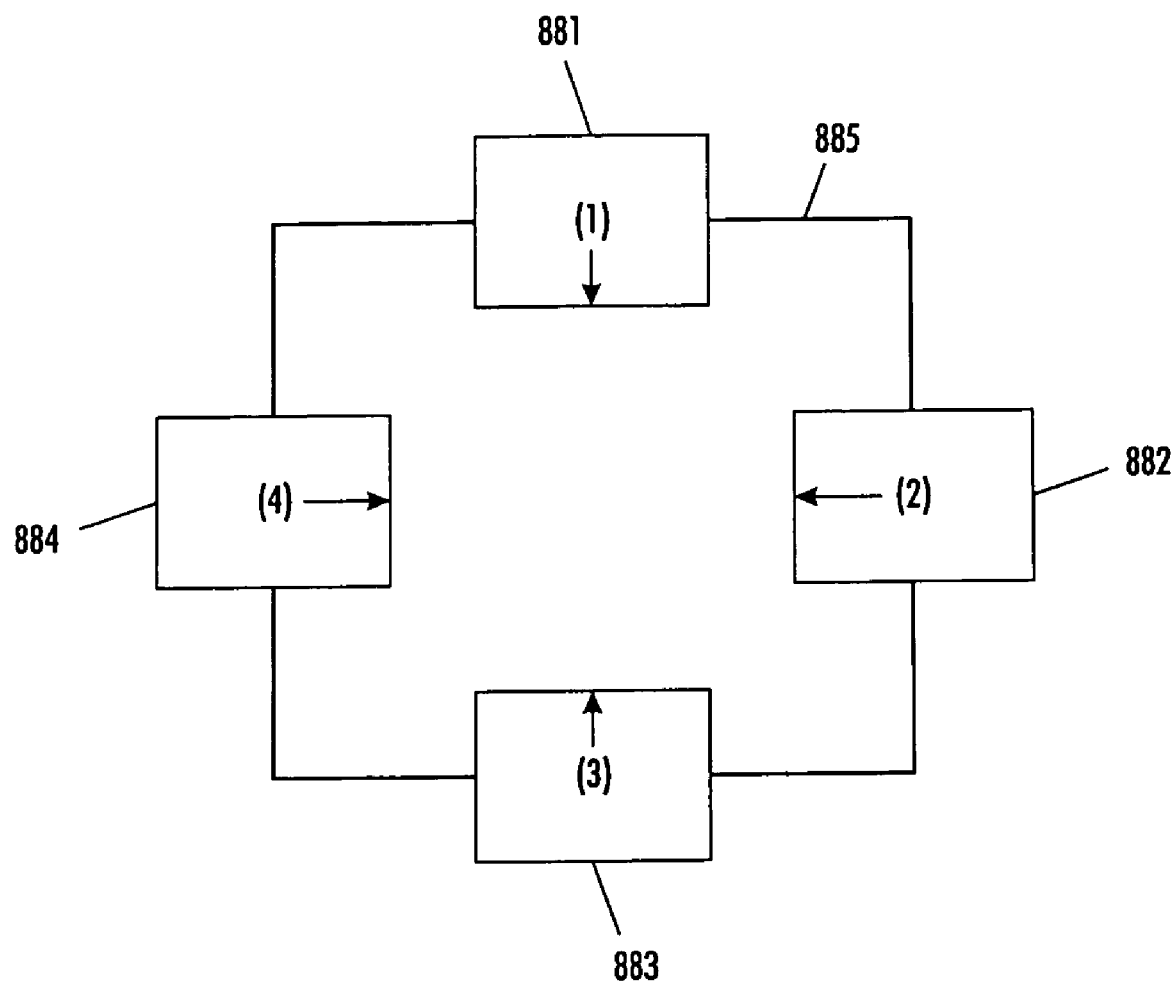
FIG. 12 illustrates the requirements for one cluster to be determined to spatially overlap another cluster.

Since the cluster merging method above is optimized, it is also used during the initial insertion of blobs into the tile cluster structure. A candidate temporary spatial cluster is created which has the extended bounding box computed for the current blob and whose cont field points to the blob. Its next field is empty since it is not yet part of a list. The color cluster chain is searched for a color match. If a matching color cluster is not found a new color cluster is initialized using the color and entended bounding box fields of the current cluster. Then the spatial cluster list of the matching (or new) color cluster is searched for any spatial clusters with extended bounding boxes which intersect the current spatial cluster. If a spatial match is found the current cluster is merged into the matching spatial cluster. If no match is found the current cluster is added to the beginning of any existing content of the color cluster. The testing for a spatial match is illustrated in FIG. 12. The test for spatial matching is only performed between clusters that are already closely matching in color. The requirement for spatial match is that there is at least one-pixel overlap between the two extended bounding boxes of the clusters, as, for example, by boxes 881, 882, 883 and 884 with 885 in FIG. 12. In order to achieve a spatial match between text words and characters, the expanded bounding boxes are used, with the expansion being proportional to the bounding box area up to a certain limit, as discussed above.

If such an overlapping cluster is found, the current cluster data is merged into that spatial cluster. A new aggregated bounding box is established, which includes the extent of the merged bounding boxes. Therefore, the aggregated bounding box has an extent in the x-dimension that includes the widest expanse of the blobs in the newly merged cluster, in the x-direction. Similarly, the aggregated bounding box has an extent in the y-dimension, that includes the widest expanse of the blobs in the newly merged cluster in the y-direction.

Figure 13:
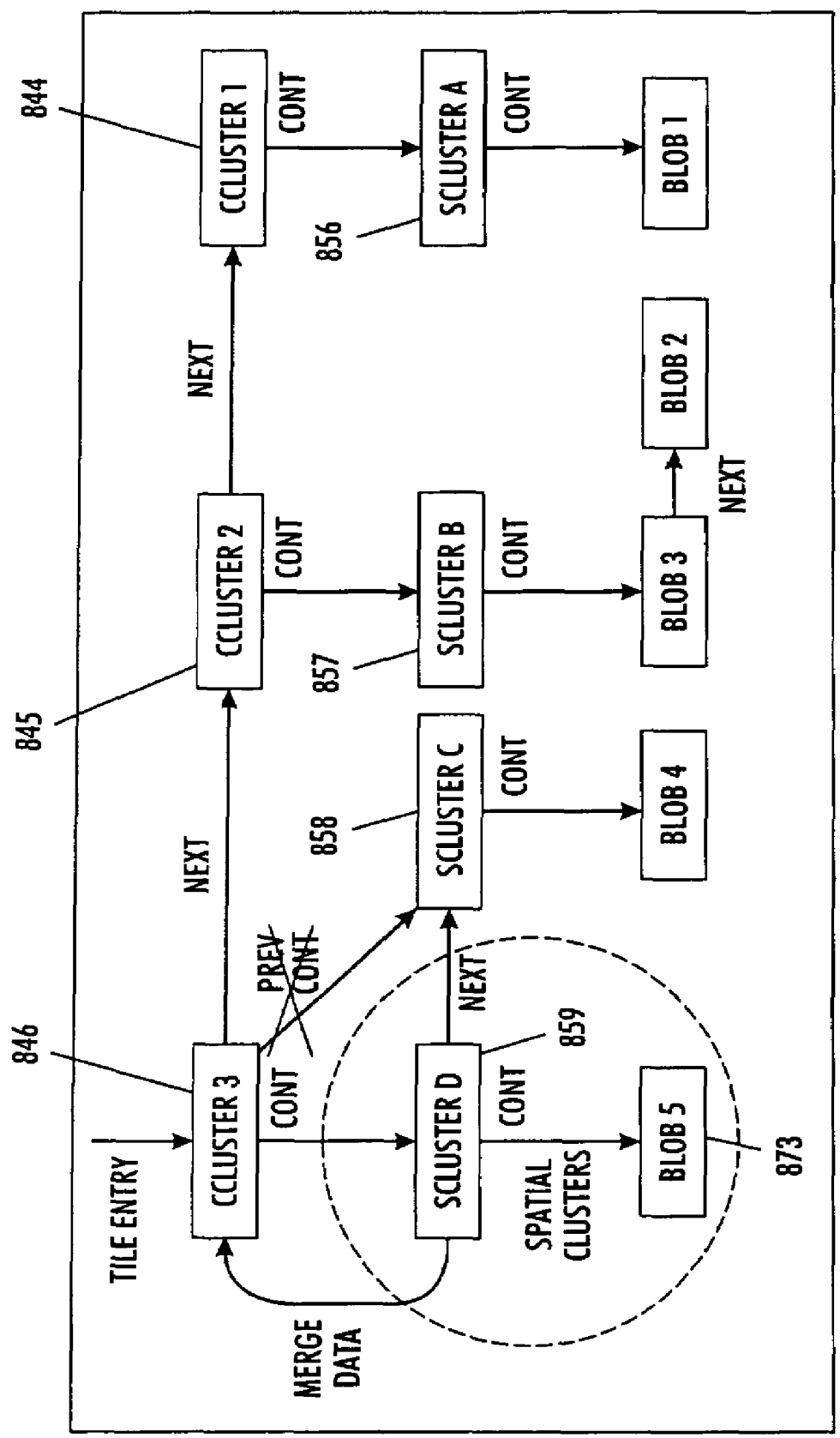
FIG. 13 illustrates how a blob with a spatially overlapping expanded bounding box is added to the cluster chain by the build clusters module of the blob cluster processing module of FIG. 5.

As discussed above, if no spatially overlapping cluster is found, the current spatial cluster is added to the beginning of the content list of (a possibly new) color cluster. FIG. 13 illustrates the process of inserting a new spatial cluster into an existing cluster chain. A new spatial cluster 859 is allocated as a copy of the current spatial cluster, as illustrated in FIG. 13. New cluster 859 is inserted at the beginning of the spatial cluster chain. The previous cont field of color cluster 846 is copied to the next field of cluster 859, and then the cont field of color cluster 846, which previously pointed to cluster 858, is modified to indicate new cluster 859. This establishes the location of the new cluster 859 in the spatial chain. Finally, the cont field of the new spatial blob 859 is updated to be the current blob 873. This completes the 3-level structure 735-737 for this case.

The build clusters module 720 next proceeds to inspect the next blob in the GTB. This process repeats until all of the blobs have been inserted into the 3-level structure 735-737 based on their color match and spatial proximity.

Once the entire three-level structure 735-737 has been completed, the build clusters module 720 begins to merge the clusters to reduce the number of remaining clusters. The color clusters are merged only if their average color is close enough, as defined by a programmable parameter. The spatial clusters are merged only if their expanded bounding boxes overlap (see FIG. 12).

Figure 14:
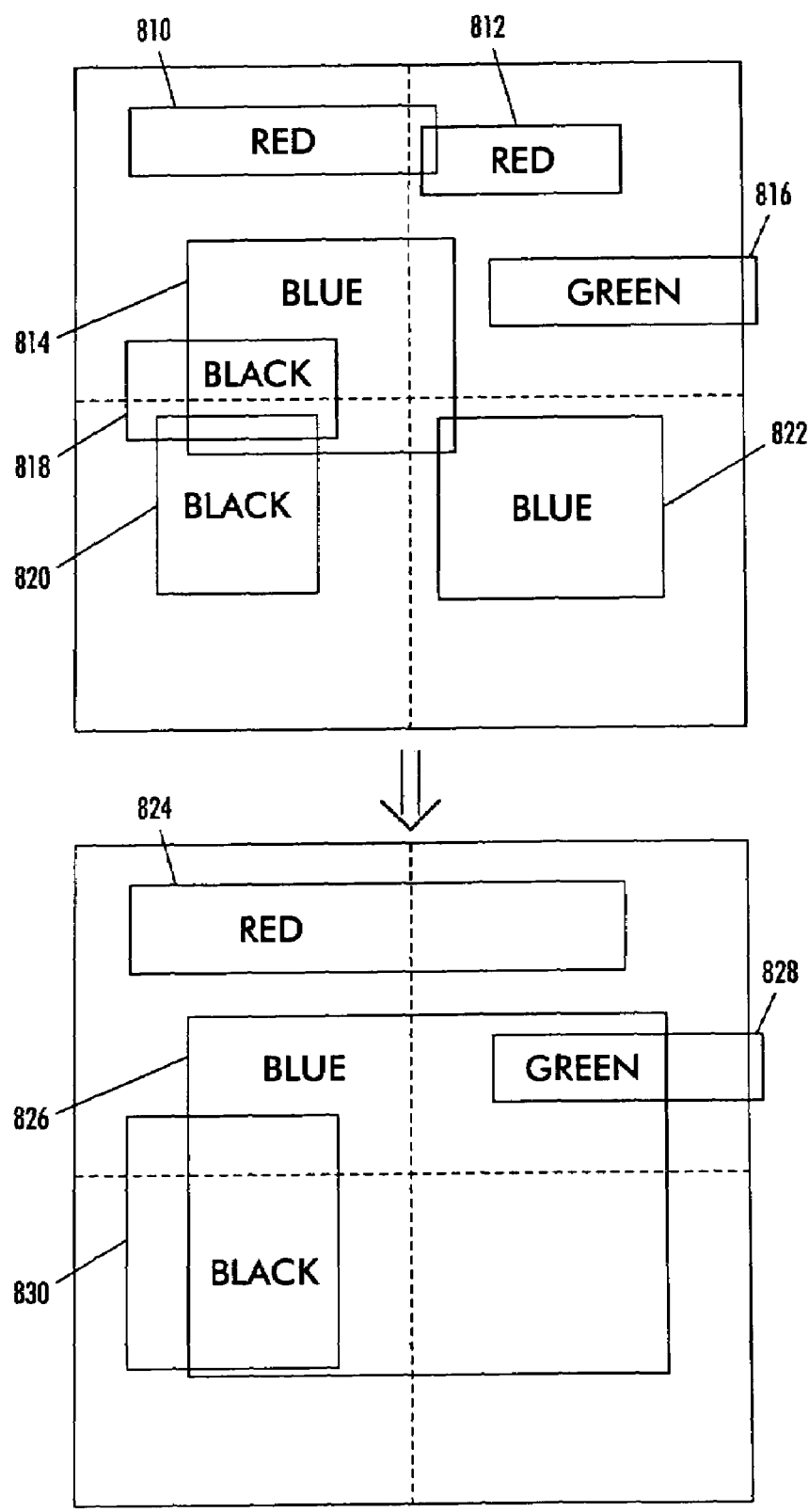
FIG. 14 illustrates how the clusters are combined by combining tiles of the image page.

After cluster merging, the boundary between each 2×2 set of adjacent tiles is removed, by merging clusters which overlap across the tile boundary. The removal of the tile boundaries and the merger of clusters is illustrated by FIG. 14. The top-left tile in FIG. 14 has 3 color clusters 810, 814 and 816, the top-right has two, 812 and 816, and the other tiles just one cluster each 820 and 822 (for a total of 6 clusters), before the boundary between the tile boundaries is removed. Assuming that average colors are closely matching, the bottom part of FIG. 14 shows that only 4 color clusters are retained after the one merger step, 824, 826, 828 and 830. The pairs of red, blue, and black clusters are merged together and the new bounding boxes are updated for each color, to cover the combined area. However, clusters will not be merged if the colors are not closely matching (for color clusters), or if they the expanded bounding boxes do not overlap (for spatial clusters).

At this point a new cluster array is allocated with half the number of tiles in each direction, and the entries are filled with the combined data. The merge operation for one 2×2 set of tiles, is illustrated in FIG. 14. The merge process repeats until the tile size covers the entire image data.

Figure 15:
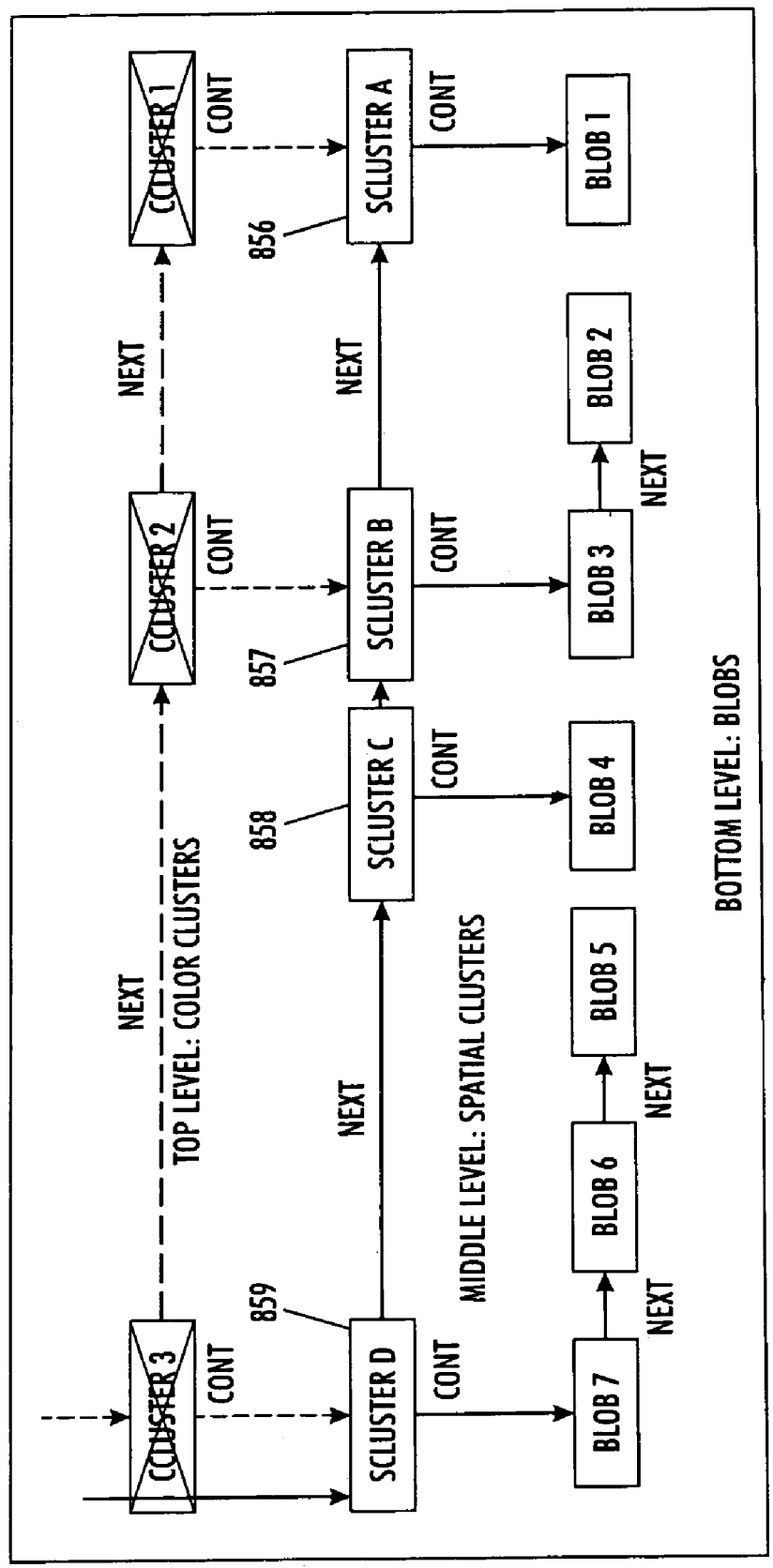
FIG. 15 illustrates how the top level of the color clusters is removed by the cluster merge module of the blob cluster processing module.

The final cluster structure is passed to the merge clusters module 705. The merge clusters module 705 first removes the top level 735 of color clusters from the cluster structure. This leaves just the spatial color clusters and their associated blobs. The operation of the merge cluster module 705 is illustrated in FIG. 15. The color clusters are removed and the memory is freed. The spatial clusters are then linked into a long chain via the their next fields, as illustrated in FIG. 15. For example, the next field of cluster 859 is modified to point to cluster 858, and the next field of cluster 858 to point to cluster 857, and the next field of cluster 857 to point to cluster 856, and so forth.

Figure 16:
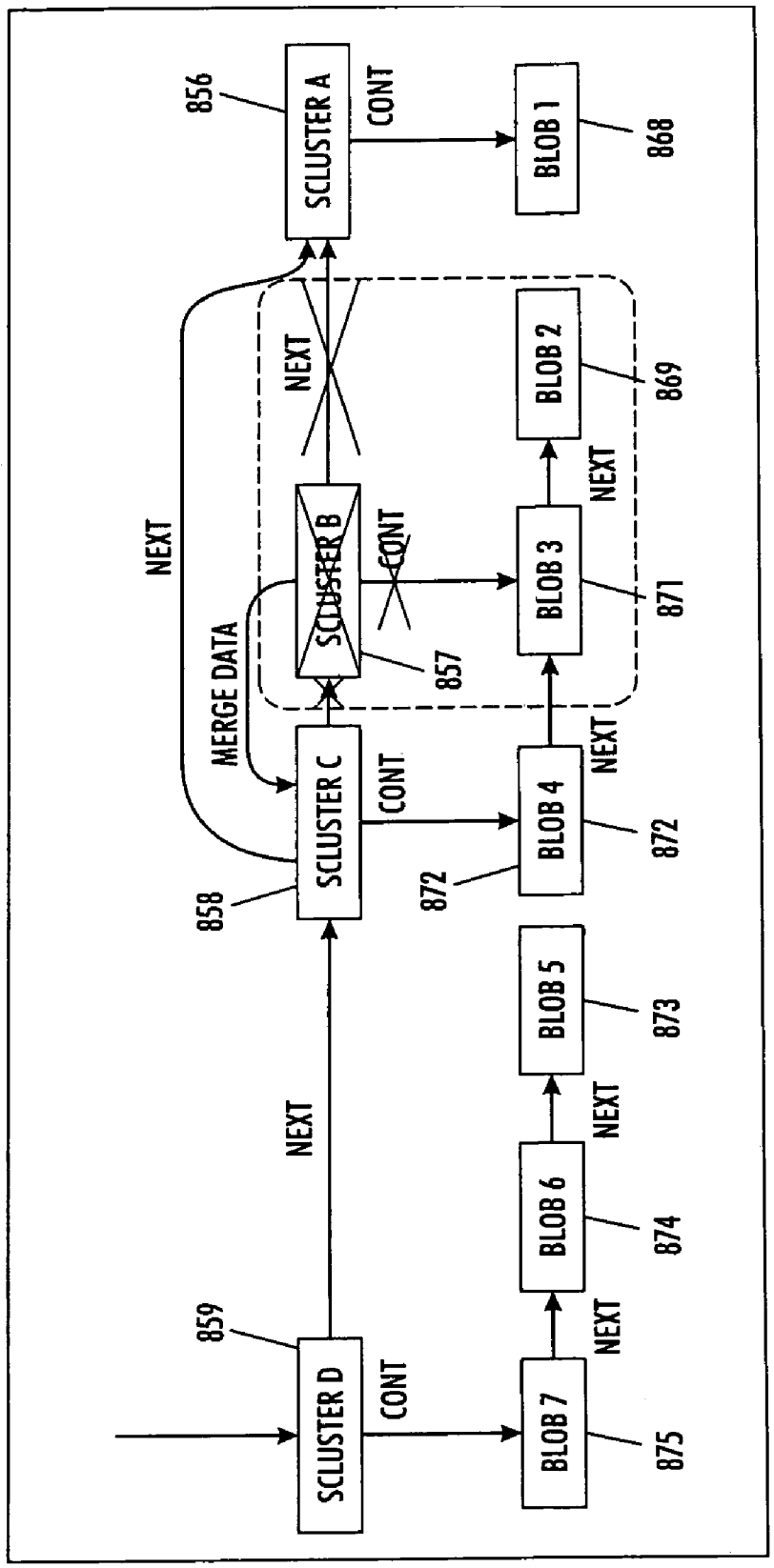
FIG. 16 illustrates how spatial clusters are merged by the cluster merge module of the blob cluster processing module.

The merge clusters module 705 searches the chain of spatial clusters again for the possibility to merge clusters based on color match and spatial overlap. If a match is found, the data is merged into the first cluster as described above and the second cluster is deleted. The links are reconnected to maintain the list without the cluster that was eliminated. The operation of the merge clusters module 705 is illustrated in FIG. 16. This exhaustive test of each cluster with every other cluster is greatly speeded up by first doing an optimized sort of the list based on the bounding box minimum y coordinate. Then each cluster is tested against all clusters beyond its position in the list. For a particular reference cluster, the checking proceeds down the list (beginning with the reference cluster's next field) only until a cluster is encountered that has a minimum y greater than the maximum y of the current reference cluster. This means that typically, only a short span of the list needs to be compared with each cluster.

As illustrated in FIG. 16, if the merge clusters module 705 detects a spatial cluster 857 which overlaps an existing spatial cluster 858, the contents of cluster 857 are inserted into the cluster chain of 858, by updating the next pointer of the blob 872, contained in cluster 858 to refer to the contents of previous cluster 857. Therefore, previously existing cluster 858 now contains existing blob 872, which in turn is linked to the new blob in the chain 871 which in turn is linked to blob 869. Clusters 859 and 856 which are unaffected by the merge process remain as before, along with their associated content blobs 875, 874, 873 and 868.

The spatial clusters are re-calculated by the merge clusters module 705, directly from the associated blob data content. The merge clusters module 705 re-calculates by evaluating the chain of spatial clusters. For each spatial cluster, the pixel count, the color average, and aggregated bounding box (no expansion) are re-calculated based on the blobs contained in the cluster. The accumulated YCC color sums may be monitored to prevent overflow when necessary, by, for example, dividing both the sums and the pixel count by two. The spatial cluster data is replaced with the re-calculated data. The re-calculation process is similar to that performed by the cluster sort, module 730 described above, except for using the exact bounding box instead of the expanded ones.

The reason for re-calculation is that blob clustering by the build clusters module 720 relied on expanded bounding boxes to connect clusters. But having completed the clustering, the accurate bounding boxes are needed to calculate the area size prior to the separation into N layers. In addition, the repeated cluster merging operation may suffer from accumulated errors. Lastly, the merge clusters module 705 checks the actual cluster pixel counts, without expansion, in order to eliminate clusters that are too small.

The merge clusters module 705 eliminates clusters that may be bad, and re-adjusts the blob mark fields. A spatial cluster is considered marked if it is either too small (pixel count below a certain threshold) or the fraction of blobs it contains that are marked exceeds a certain level. In that case, the mark fields of all the blobs linked to the cluster are set to a non-zero value. Otherwise, the mark fields of all the blobs linked to the cluster are cleared (no mark). Spatial clusters that are marked as indicated above are eliminated and the next links are updated to maintain the list of spatial clusters without the eliminated clusters. This filtering allows very small blobs such as periods in text which normally might be eliminated as being too small, to be included since they will have been clustered with mostly unmarked text blobs. On the other hand, undesirable blobs that might accidentally be found in images are likely to be marked and cause their clusters to be removed.

A natural result of the blob identification process is that every blob is either completely within or completely outside every other blob. After the merge clusters module 705 completes the merge process, the inner blob module 760 checks each blob to see if it can be fully contained in another unmarked blob, i.e., if it is, it is an "inner". Any blobs determined to be inners are removed from the cluster. A typical example of inner blobs would be the inner holes contained in characters such as "b", "e", and "o", etc. The inner holes are normally classified as blobs by the blob identify module 600.

The operation of the inner blob module 760 requires checking for possible inners between all blob pairs. Because of the computational load that this situation presents, the inner blob module is applied after the merge cluster module 705, where many bad or small blobs are eliminated (marked). This leaves fewer blobs to test for inners by the inner blob module 760.

In order to further expedite performance, simple checks may be used. The simple checks reduce the number of calculations by checking only the bounding-box conditions and just one scan line of blob ID information, for example.

The inner blob module 760 examines all possible combinations of blob pairs. A first blob, blob A, is picked sequentially from the GTB which has been previously sorted by minimum y of the bounding box. A second blob, blob B, is then picked from the GTB beginning just after A. For each blob, the bounding box and blob ID are retrieved from the global table of blobs. The second blob, blob B is tested as inner with respect to blob A. The test procedure is designed to take advantage of shortcuts when possible. The module applies the following tests:

(1) The mark field of either blob is checked. If either blob A or blob B are already marked, no testing will be done (only previously unmarked pairs are tested).

(2) The pair of blobs is checked for vertical overlap based on the bounding box. If the top line of blob B exceeds the bottom line of blob A, then B cannot be inside A and because the list was sorted, no further testing for A is necessary.

(3) The bounding box of blob B is checked on all sides to make sure it is fully contained inside the bounding box of blob A. If even one side protrudes outside the blob A bounding-box, than B cannot be completely inside A.

(4) If blob A and blob B passed tests (1) through (3) above, the blob ID pixels on the middle scan line of blob B are examined starting with the minimum x pixel of blob A and proceeding to the blob A maximum x pixel on this line, as determined by the bounding box. The blob ID status is tested using a state machine to confirm transition from blob A to blob B. If the proper state is detected, blob B is marked as inner.

Figure 17:
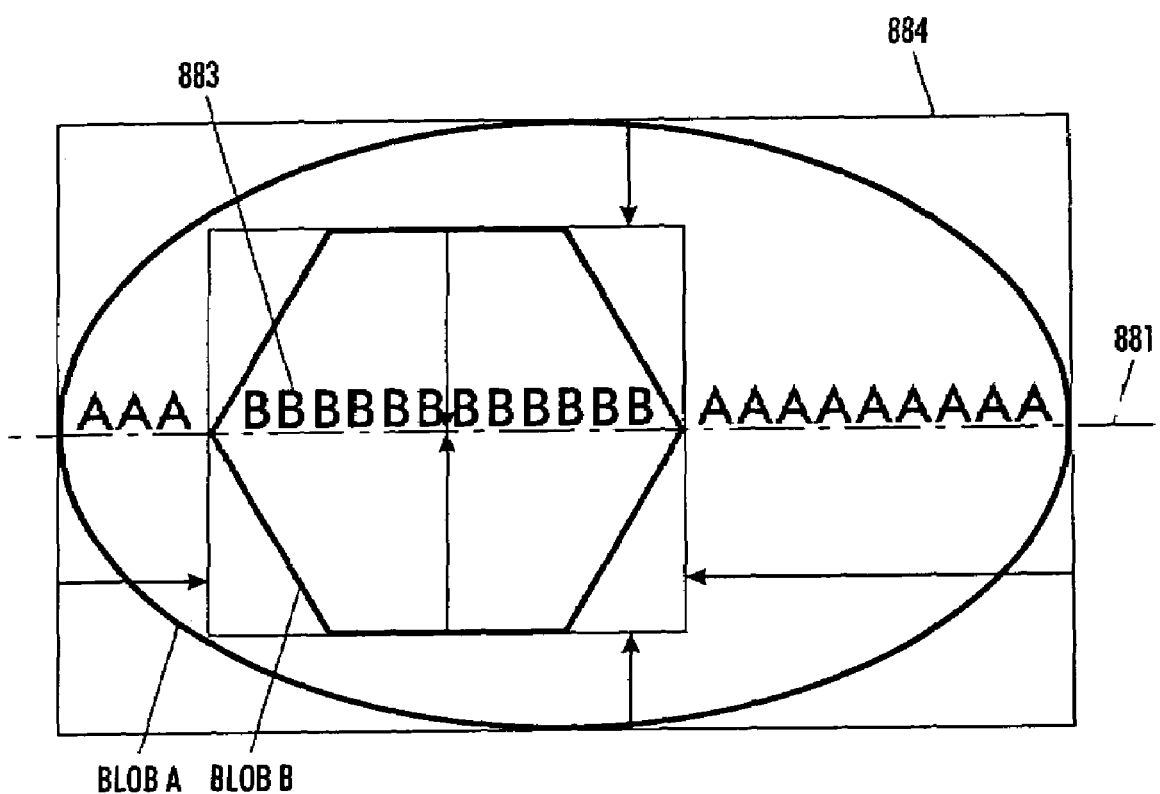
FIG. 17 illustrates the detection of an inner blob by the inner blob module of the blob cluster processing module.

The process for determining whether blob B is an inner of blob A is illustrated in FIG. 17. FIG. 17 shows a middle line 881 of bounding box 884, containing blob A. Each of the first three pixels of the middle line 881 is determined to be inside blob A, and the transition to blob B occurs for pixel 883. Since each of the previous conditions have been met, the blob B is identified as an inner of A.

Figure 18:
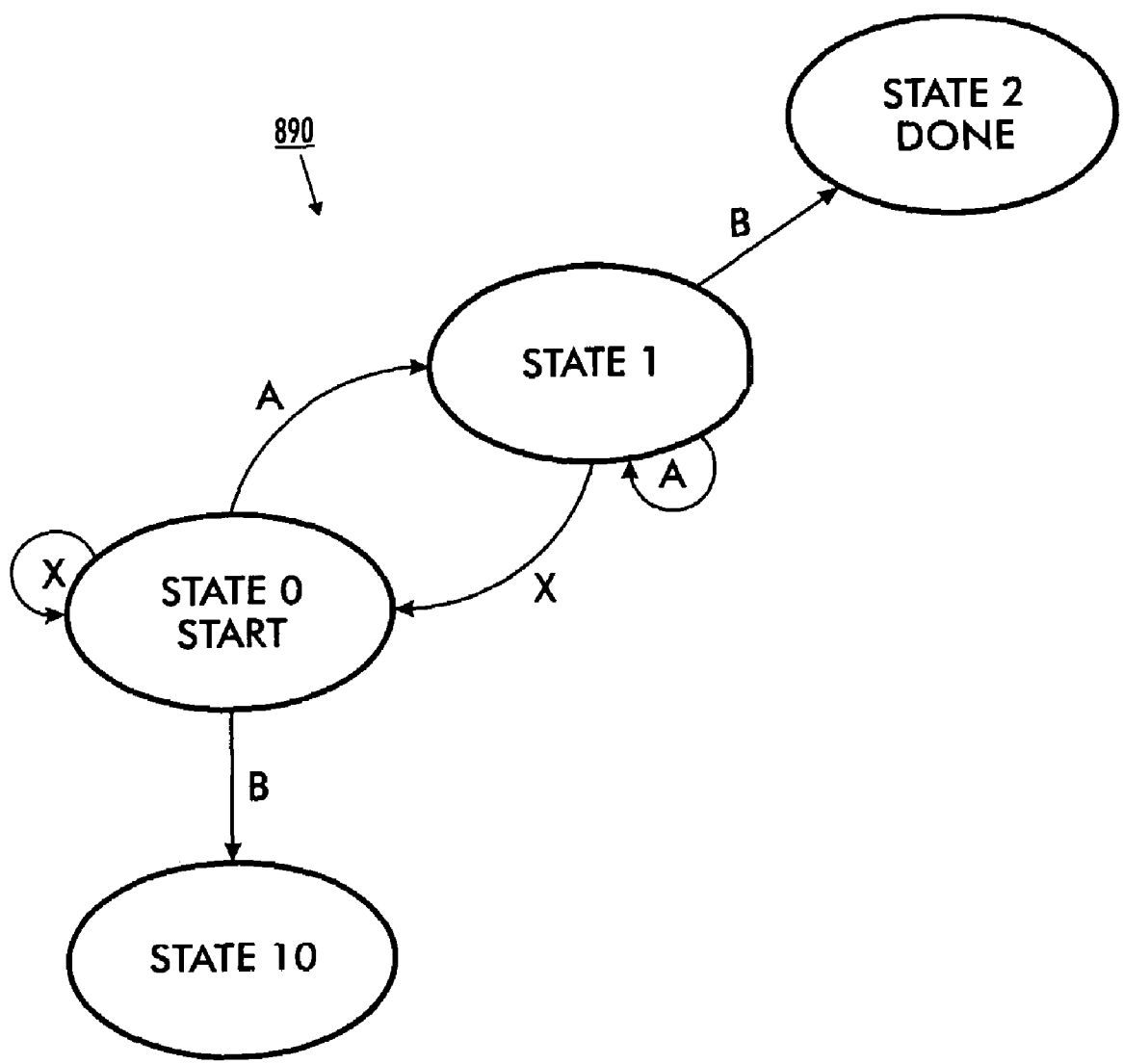
FIG. 18 is a diagram of a state machine performing the detection of an inner blob.

The state machine 890 shown in FIG. 18 illustrates an exemplary process for determining an inner blob. The state machine 890 is reset to zero state for each candidate pair of A and B blobs. As the pixels are traveled on the middle line of blob B as was shown in FIG. 17, the blob ID of these pixels is examined. The state machine 890 is looking for the first occurrence of blob ID=A. It remains zero as long as any ID other than A or B is seen. However, if blob ID B is seen before the first blob ID A, it means that B is not inside of A. In that case, the state may be set to 10, indicating that B is not an inner.

Once the first blob ID A is seen, the state is changed to 1. Now the state machine 890 begins to look for the occurrence of blob ID B. The state remains 1 as long as blob ID A continues to be observed. However, if any ID other than A or B comes after blob ID A, and before blob ID B, the state is reset to zero to start over. Only when blob ID B comes right after blob ID A the state is changed to 2 indicating that B is and inner. The test may be aborted as soon as this state is reached.

If state 2 is found, the B blob is marked as an inner blob by turning on the inner bit in the mark field 430 of the B blob. In all other cases the B blob is not marked as an inner.

It should be noted that the A to B transition (state 2) is sufficient. There is no need to check for B to A transition on the other side, as this is guaranteed by the blob identification module 600.

After checking if B is an inner of A, as described above, the process moves on to check the next B blob in the GTB. This continues until the last blob in the GTB has been evaluated or the minimum y of B is greater than the maximum y of A. At this point, all possible inners of A have been identified and marked. The process then moves on to pick the next A blob in the GTB, and again checks for inners between it and all subsequent B blobs. There is no need to check blobs prior to A since such combinations have already been tested and it is not possible for A to be outside of a blob that has a minimum y value less than or equal to A. The process continues until blob A reaches the last blob in the global table of blobs. At this point, all valid pairs of inner combinations have been examined.

The inner blob module 760 checks the blob content of each spatial cluster to see if there are any blobs that were marked as inners, that is, fully contained in another blob, by the inner blob module 760. The inner blob module 760 then follows the list of blobs associated with each cluster and recalculates the cluster information while excluding the inner blobs. This includes the re-calculation of the bounding box union (excluding inner blobs) and new weighted average color, based on the number of pixels in each blob. Again, the accumulated YCC color sums are monitored to prevent overflow by, for example, dividing both sums and count by two when necessary.

Next, the inner blob module 760 examines the resulting cluster pixel count, excluding inners, and compares it against a predetermined threshold. If the resulting cluster size is too small, the entire cluster is removed and all of its associated blobs are marked.

However, if the resulting cluster size is big enough, the updated YCC color sums are normalized by the pixel count, and the new average color, excluding inners, is loaded into the cluster data replacing the previous sums. Likewise, the new pixel count and updated bounding box information, excluding inner blobs, are loaded into the cluster data.

The cluster sort module 730 sorts the spatial clusters by size, from the largest to smallest pixel count. The purpose for sorting is to provide fast PDF viewing by drawing the larger layers first. Since, at this point, the number of layers is relatively small, the sorting method may be based on the bubble sort algorithm, as is described below in relation to FIG. 19.

The spatial cluster chain 991, 992, and 993 is followed one cluster at a time. At each step, the size of the current cluster 991 is compared with the size of the subsequent cluster 992. The subsequent cluster 992 is identified by following the next link from the current cluster 991. The cluster size is given by the count field, which contains the aggregated number of pixels in the cluster. If the number of pixels in 991 is smaller than the number of pixels in the count field of 992, the cluster positions in the chains are switched, and their next links are updated to reflect the new positions.

Figure 19:
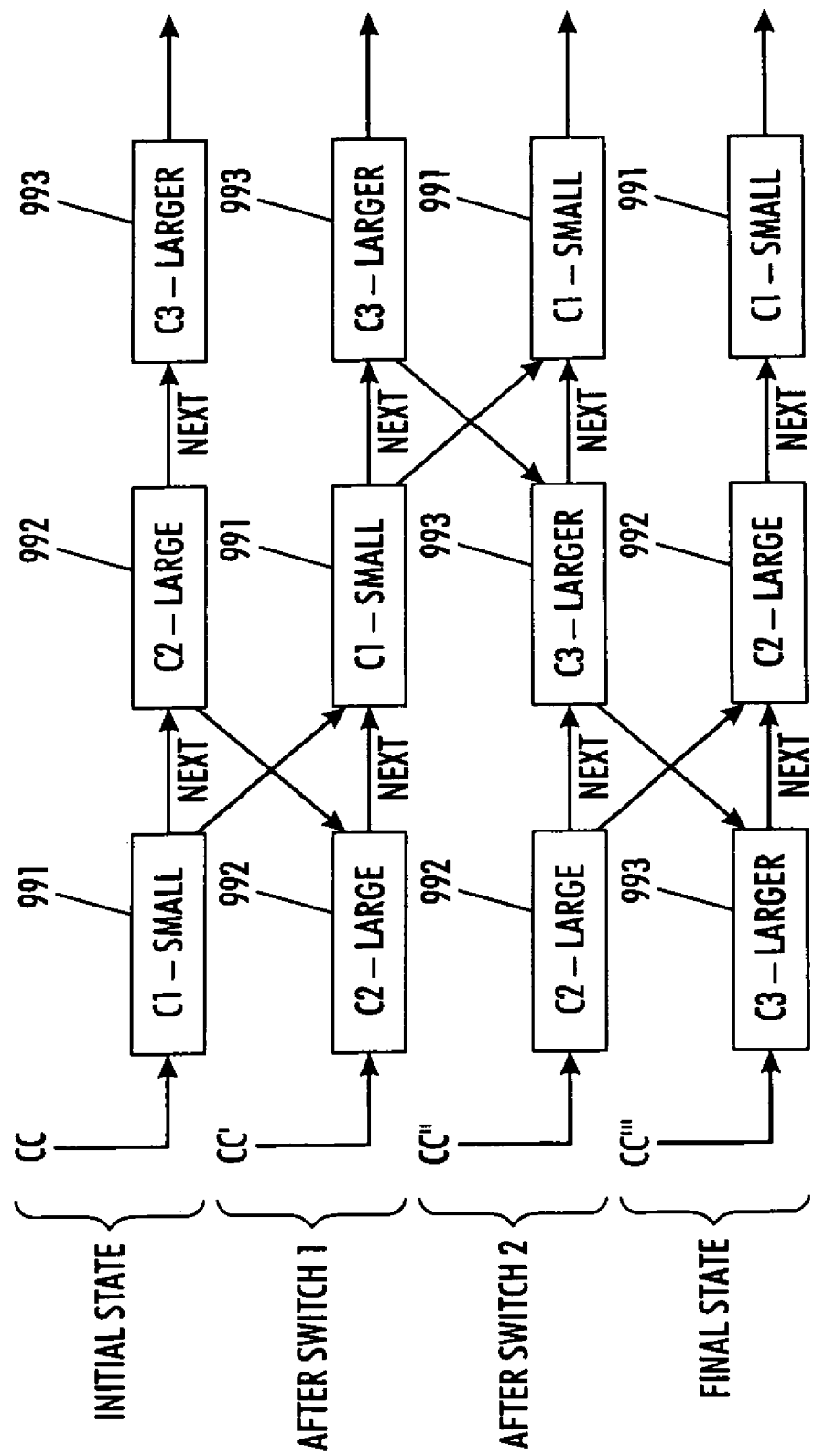
FIG. 19 is a diagram illustrating the bubble sort routine used by the cluster sort module.

For example, cluster 991 in FIG. 19 contains fewer pixels than the next cluster 992. Therefore, clusters 991 and 992 are switched. Next, the second cluster (being 991 after the switch) is tested against the third, 993. Since 991 is smaller than 993, the two are switched again. This process continues until reaching the last cluster in the chain. At the end of the first pass, the cluster with the smallest size is guaranteed to be the last cluster in the chain, since the smallest cluster, wherever it may be, is picked from its current location in the chain and bubble-sorted through the chain end. However, the clusters prior to it may still not be ordered by decreasing size. As can be seen in FIG. 19, at the end of the first pass cluster 992 is ahead of 993 even though 993 is larger. Therefore the process must be repeated N more times to ensure all clusters are sorted by decreasing size. At each time, the next smaller cluster is bubble-sorted to the end of the chain. The final state is illustrated on the bottom of FIG. 19.

It should be noted that at each sorting step, the cluster content is not changed. Only the relative position of clusters in the chain is modified. The new position is given by the updated linking order, via the next field. It should also be noted that the cont entry for each cluster is kept unchanged. This means that each cluster retains its own associated blob chain as is.

The generate layers module 750 follows the cluster sort module 730. The generate layers module 750 converts the spatial clusters into binary mask planes. Each cluster is sequentially assigned a layer number beginning with 1. As described previously, the spatial clusters, and therefore the binary planes, are sorted by descending pixel count values. The selector plane, an additional binary mask plane number 0, will be the union of layers 1 through N and has the same size as the background layer. Thus, the number of layers is the same as the number of surviving spatial clusters+1.

The generate layers module 750 may also remove the white border around each plane, and byte-align each plane to an even byte boundary. Byte alignment of the individual planes speeds up the process of creating layer 0, the union of all layers. To produce a byte aligned layer, the generate layers module 750 reduces the left coordinate (minimum x) of the bounding box so that it becomes a multiple of 8. This can slightly increase the size of the layers. Only the bounding box left coordinate is modified by the generate layers module 750.

The generate layers module 750 then creates the binary (N+1)-planes. Planes 1 through N contain the binary data for the corresponding layers. The size of each plane is determined based on the (byte aligned) bounding box calculated by the generate layers module 750. Plane 0 contains the binary selector layer that is equivalent to the combined OR-ed data from layers 1 to N. The size of plane 0 is the same as the background plane.

The generate layers module 750 creates one plane at a time. As described previously, the cluster sort module 730 sorts the planes by decreasing pixel count value. For each plane, the byte aligned bounding box is used to calculate the plane size and allocate the right amount of memory storage for the binary image. The plane is initially set to zero. Then each blob in the plane's cluster content list is processed. For each blob, all the locations the ID map image corresponding to the blob's bounding box are examined. For every map pixel in this bounding box which has an ID equal to the blob's ID the corresponding bit in the layer plane is set to one. After each plane is created, the bits are also OR-ed into plane 0, the selector plane. The OR process is greatly simplified when all layers are previously byte-aligned by the generate layers module 750, such that no data shifting on sub-byte boundaries is necessary. The number of planes is identical to the number of surviving layers. Each plane is in the packed binary format (1 bit per pixel, 8 pixels per byte).

Although the previous description was given with reference to a hardware embodiment, the blob clustering process can also be implemented as software executing on a microprocessor. In this case, each of the steps of the method is carried out by a suitably programmed microprocessor, or by a combination of hardware and software.

Figure 20:
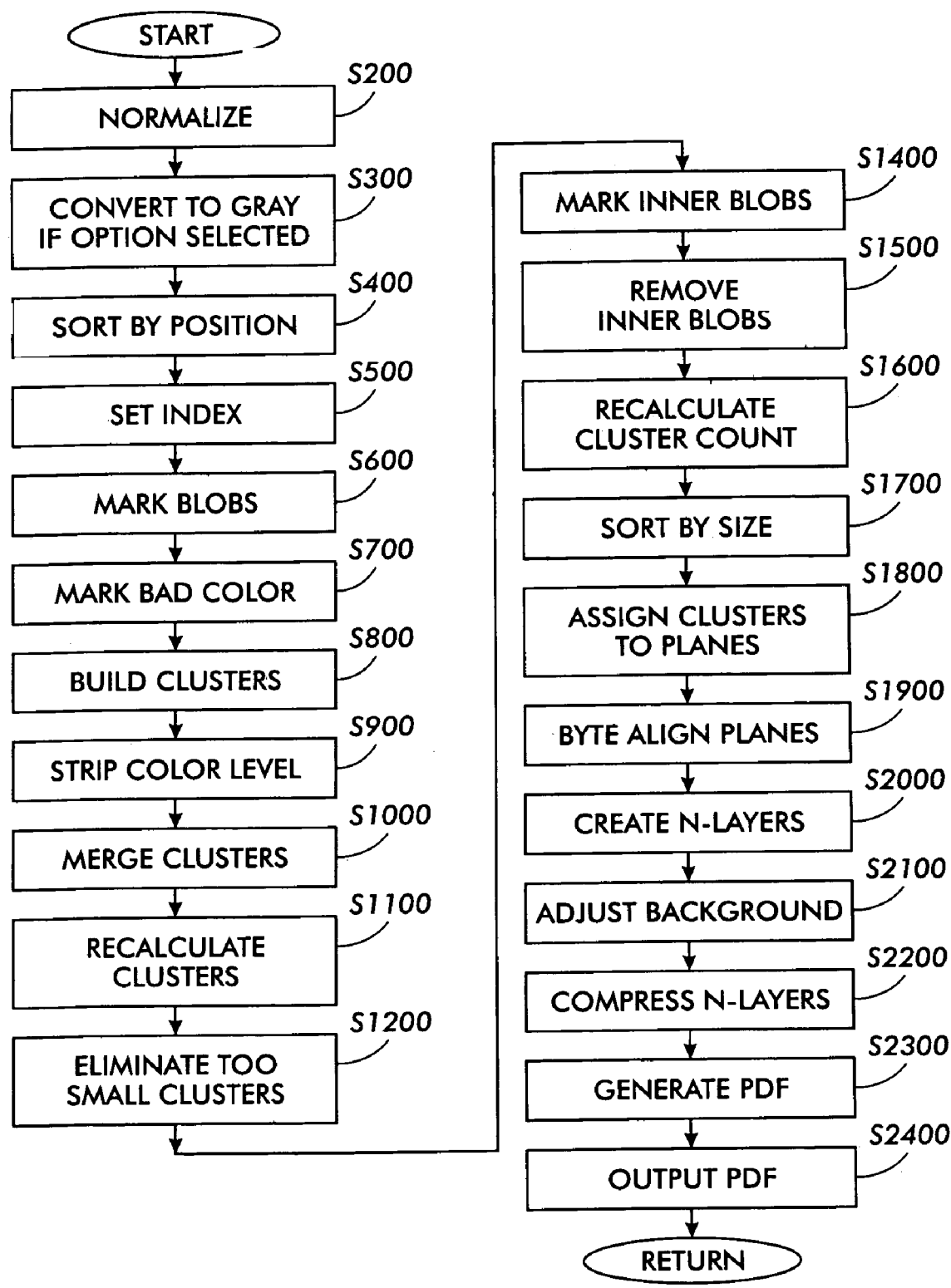
FIG. 20 is a flowchart outlining an exemplary method for organizing and marking blobs into binary plane data which is used to produce a compressed representation of a page.

FIG. 20 is a flowchart illustrating one exemplary embodiment of a method for converting the blobs listed in a global table of blobs into n binary foreground layers. As shown in FIG. 20, operation of the method begins in step S200, where each blob in the global table of blobs is normalized. In various exemplary embodiments, the blobs are normalized according to their pixel count. The process then proceeds to step S300. In step S300, the YCC of the blobs is converted to a continuous gray tone, if that option is selected. The process then proceeds to step S400. In step S400, the blobs are sorted according to their position in the scanned image. The process then proceeds to step S500. In step S500, an index is assigned to each blob to store their sorted order. The process then proceeds to step S600. In step S600, each blob is analyzed and marked according to one of a number of test conditions. The process then proceeds to step S800. In step S800, the blobs whose color variability exceeds a certain threshold are marked. The process then proceeds to step S900.

In step S900, the clusters are built from the GTB, where the clusters are made from blobs which are similar in color and which near each other. In step S1000, the top level (the color level) of the cluster table created in step S900, is removed. In step S110, the clusters which are sufficiently similar in color and which overlap spatially, are merged to reduce the number of surviving clusters. In step S1200, the remaining clusters colors are re-calculated and the cluster counts are updated after the merge operation of step S1100. In step S1300, clusters which do not include a minimum threshold number of pixels are eliminated from the cluster list. In step S1400, blobs which are fully contained in another blob are marked as "inners". In step S1500, the blobs previously marked as inners are removed. In step S600, the remaining clusters are re-calculated after the removal of the inner blobs in step S500. In step S1700, the blobs are sorted by size.

In step S1800, the remaining clusters are assigned sequentially to binary foreground planes. In step S1900, the different foreground planes are byte-aligned to an even byte boundary. Next, in step S2000, the N+1 binary planes are generated. Plane 0, the selector plane, is used to mask the image data within the grayscale background plane. The grayscale background plane is adjusted to improve compressibility. Then, in step S2100, each of the separate binary foreground planes determined in step S1900 are compressed using a compression technique that is appropriate to such binary foreground planes. Operation then continues to step S2200.

In step S2200, the background plane is compressed using a compression technique that is appropriate for such data. Then, in step S2300, a portable document format (PDF) document file is generated from the compressed binary foreground planes and the compressed grayscale background plane. Next, in step S2400, the generated portable document format (PDF) document file is output to a downstream processor and/or stored in a memory. Operation then ends.

It should also be appreciated that, in various exemplary embodiments, any known or later-developed document format, in place of the portable document format (PDF) can be used in steps S2300 and S2400.

Figure 21:
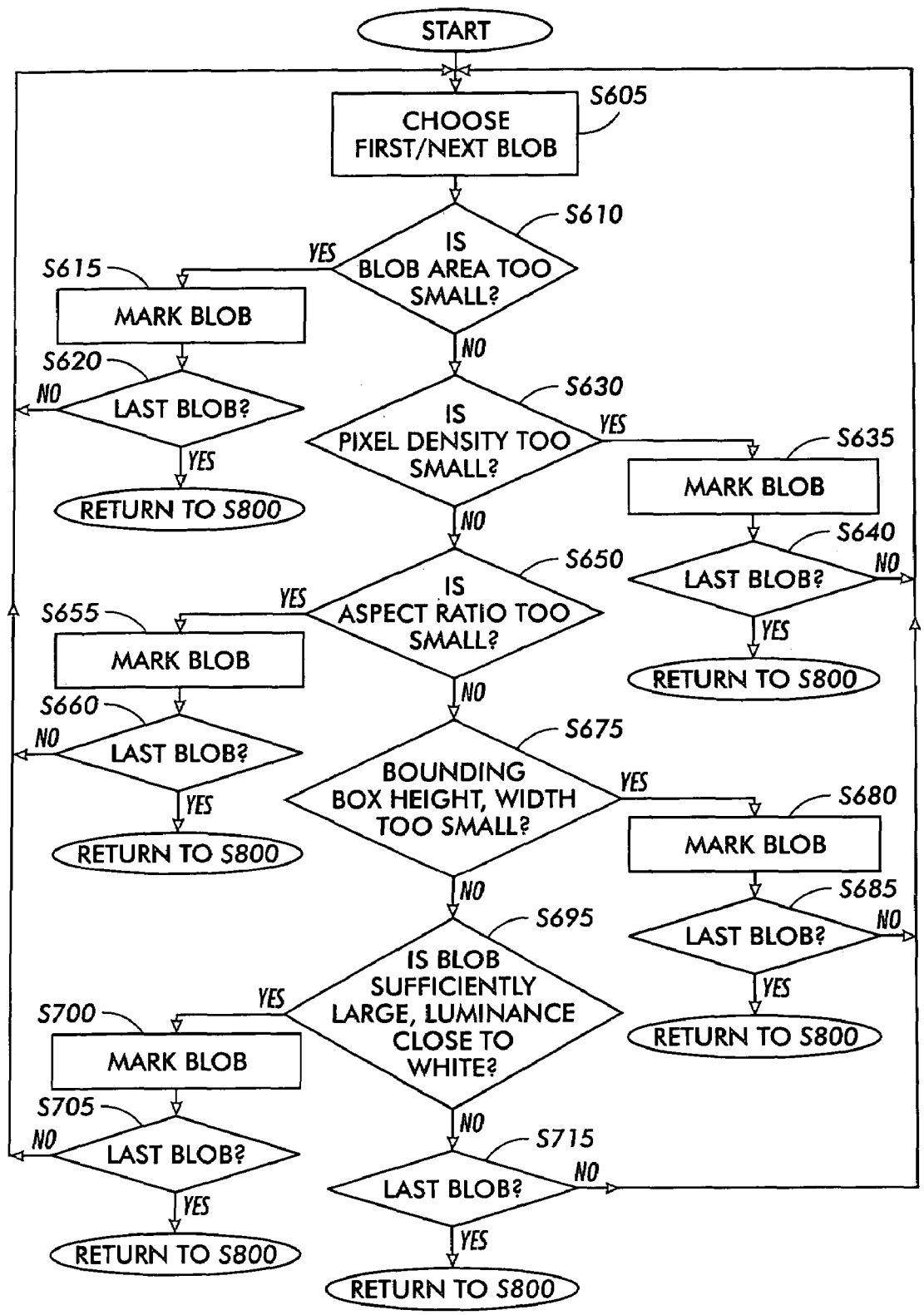
FIG. 21 is a flowchart outlining in greater detail an exemplary method for marking clusters according to various test criteria.

FIG. 21 shows further detail of step S600 of FIG. 20. The process begins in step S605 wherein the first or next blob is selected from the global table of blobs. The process then proceeds to step S610. In step S610, a determination is made whether the blob area is smaller than a certain predefined threshold. If so, control proceeds to step S615, in which the blob is marked with a code indicative of the blob area being too small. The process then proceeds to step S620. In step S620, a determination is made whether the last blob in the global table of blobs has been reached, and if not, control returns to step S610 in which the next blob in the table is selected. If the last blob has been reached, the process ends and control returns to step S800 of FIG. 20.

If a determination is made in step S610 that the blob area is not smaller than the certain predefined threshold, operation proceeds to step S630, wherein a determination is made whether the blob pixel density is smaller than a predefined threshold. If so, the blob is marked in step S635 with a code indicative of the pixel density being too small. In step S640, a determination is made whether the last blob in the global table of blobs has been reached, and if not, control returns to step S605 wherein the next blob in the table is selected. If the last blob in the table has been reached, the process ends and control returns to step S800 of FIG. 20.

If the determination is made in step S630 that the pixel density is not smaller than the predefined threshold, operation proceeds to step S650, wherein a determination is made whether the aspect ratio of the blob is larger or smaller than certain predefined thresholds. If the aspect ratio is smaller or larger than the predefined threshold, the blob is marked with a code indicative of the aspect ratio being smaller or larger than a certain predefined threshold. A determination is made in step S660 whether the last blob in the table has been reached. If not, control returns to step S605, wherein the next blob in the table is selected. If the last blob in the table has been reached, control returns to step S800 of FIG. 20.

If the determination is made in step S650 that the aspect ratio of the blob is not smaller or larger than a certain predefined threshold, operations proceeds to step S675, wherein a determination is made whether the blob boundary box height or width is smaller than a predefined threshold. If so, control proceeds to step S680, wherein the blob is marked with a code indicative of the boundary box height or width being smaller than a predefined threshold. In step S685, a determination is made whether the last blob in the table has been reached. If not, control returns to step S605 wherein the next blob in the table is selected. If the last blob in the table has been reached in step S685, control returns to step S800 of FIG. 20.

If the determination is made that the blob bounding box height and width are not smaller than a certain predefined threshold, control proceeds to step S695, wherein a determination is made whether the blob is sufficiently larger than a certain predefined threshold, and whether the luminance is close to white. If so, the blob is marked in step S700 with a code indicative of the blob being larger than a certain predefined threshold and the luminance being close to white. A determination is then made in step S705, whether the last blob in the table has been reached. If not, control returns to step S605, wherein the next blob in the table is selected. If the last blob in the table has been reached, control returns to step S800 of FIG. 20.

If the determination in step S715 that the blob is not sufficiently large and the luminance is not close to white, then a determination is made in step S715 whether the last blob in the table has been reached. If not, control returns to step S605, wherein the next blob is selected. If so, control returns to step S800 of FIG. 20.

Figure 22:
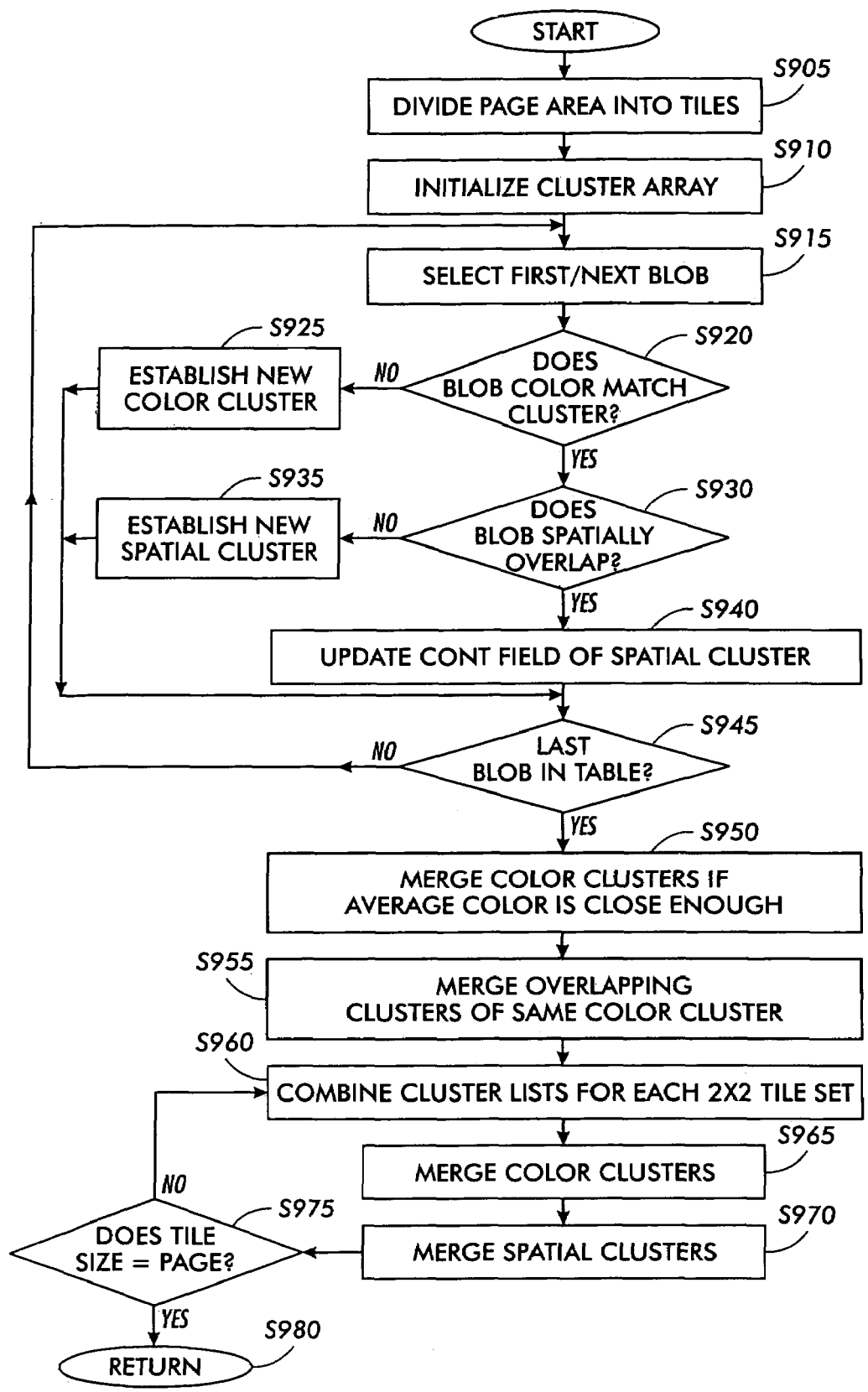
FIG. 22 is a flowchart outlining in greater detail an exemplary method for organizing and relating various clusters of blobs.

FIG. 22 shows a flowchart outlining further detail of step S900 of FIG. 20. According to FIG. 22, the process begins in step S905, wherein the page area is divided into square tiles. The process then proceeds to step S910. In step S910, a cluster array is initialized, which will contain pointers to blobs belonging to various clusters listed in the cluster array. The process then proceeds to step S915. In step S915, the first or next blob from the global table of blobs is selected. The process then proceeds to step S920. In step S920, the blob color is compared to the colors of the clusters in the cluster array, to determine whether there is a color match. If not, a new color cluster is created in the cluster array in step S925, and control jumps to step S945, wherein a determination is made whether the last blob in the table has been reached. If the color does match an existing color cluster, a determination is made in step S930, to see if there is a spatially overlapping cluster in the content list of the color cluster. If not, a new spatial cluster is added to the content list of the color cluster, and control jumps to step S945, wherein a determination is made whether the last blob in the table of blobs has been reached. If there is a spatially overlapping cluster, the present blob is added to the chain of blobs in its cont field, in step S940. In step S945, a determination is made to see if the last blob in the table has been reached. If not, control returns to step S915 to obtain the next blob. If so, operation proceeds to step S950.

In step S950, clusters in the cluster array are merged if the distance between the colors is close enough. In step S955, clusters having the same color and overlapping spatially are also merged. In step S960, the cluster lists for sets of 2×2 tiles are combined. As a result of the combination, clusters having the same color are merged in step S965. Cluster which have the same color and overlap spatially as a result of the combination are also merged in step S970. In step S975, a determination is made whether the size of the combined tiles is the same as the page image size. If not, control returns to step S960, where the cluster lists of another 2×2 set of tiles is combined. If the size of the combined tiles is the same as the page image size, the procedure ends at step S980, and returns to step S1000 of FIG. 20.

Figure 23:
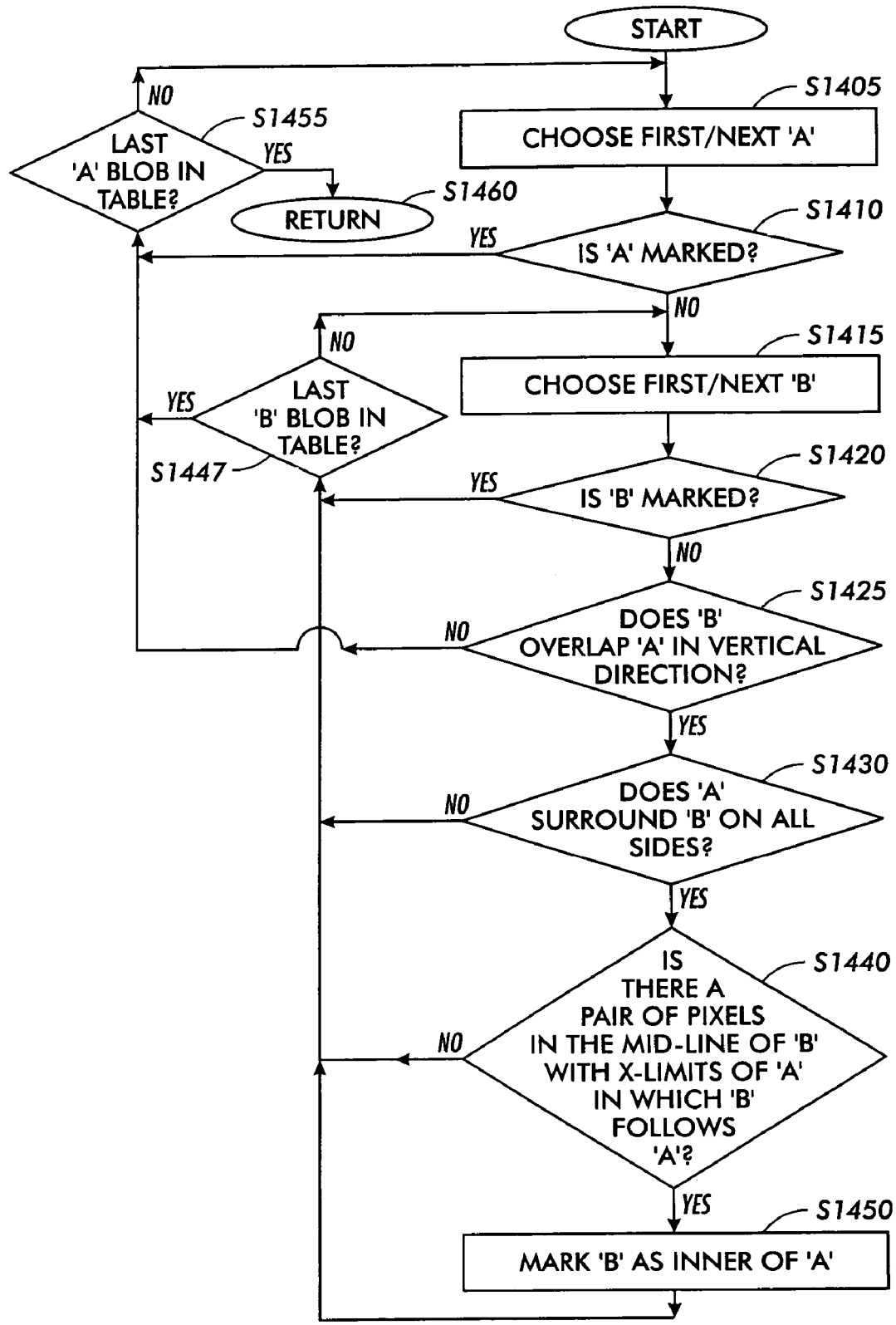
FIG. 23 is a flowchart outlining in greater detail one exemplary embodiment of a method for identifying and marking blobs which are fully contained in another blob.

FIG. 23 shows a flowchart outlining further detail of step S1400 of FIG. 21. According to FIG. 23, the procedure starts in step S1405, wherein the first blob A is selected from the global table of blobs. A determination is made in step S1410, whether blob A is already marked. If so, control proceeds to step S1455, wherein a determination is made whether the last blob in the table has been reached. If not, control returns to step S1405, wherein the next blob A is selected from the global table of blobs. If A is not marked, the second of the pair of blobs, blob B is selected from the global table of blobs in step S1415. A determination is made in step S1420, whether blob B is already marked. If so, control jumps to step S1447, wherein a determination is made whether the last B blob in the table has been reached. If not, control proceeds to step S1415, and the next blob B is selected. If the last blob B1 in the table has been reached, control jumps to step S1445, wherein a determination is made whether the last A blob has also been reached. If so, the process ends in step S1460.

If blob B is not marked, control proceeds to step S1425, wherein a determination is made whether blob B overlaps blob A in the vertical direction. If not, control returns to step S1447, wherein a determination is made whether the last B blob in the table has been reached. If blob B does overlap blob A in the vertical direction, a determination is made in step S1430, whether the bounding box of blob A surrounds the bounding box of blob B on all sides. If not, control returns to step S1447, wherein a determination is made whether the last B blob in the table has been reached. If the bounding box of blob A does surround the bounding box of blob B on all sides, control proceeds to step S1440, wherein a determination is made whether there are two adjacent pixels on the middle line segment where the first belongs to A and the second belongs to B. If not, control returns to step S1447, wherein the next blob B is selected from the global table of blobs. If the A to B pixel pair is found on the line segment spanning the width of A, then blob B is marked as an inner of blob A in step S1450. Then, control proceeds to step S1447.

In step S1447, a determination is made whether the last B blob in the global table of blobs has been reached. If not, control returns to step S1415, wherein the next blob B is selected from the global table of blobs. If the last B blob in the global table of blobs has been reached in step S1447, then control proceeds to step S1455, wherein a determination is made whether the last A blob in the table has been reached. If so, then control proceeds to step S1460, wherein the process ends, by returning to step S1500 of FIG. 20.

While the invention has been described in conjunction with various exemplary embodiments, these embodiments should be viewed as illustrative, not limiting. Various modifications, substitutes, or the like are possible within the spirit and scope of the invention.

What is claimed is:

1. A method for organizing regions identified in image data, comprising:
    averaging colors of regions of a spatial cluster to generate an average color;
    assigning the average color as a color of the spatial cluster;
    setting a size of the spatial cluster to a total number of pixels contained in the spatial cluster;
    forming one or more color clusters, each color cluster including regions of the image data having a color difference that is less than a color threshold;
    grouping two or more regions included in a color cluster into one of one or more spatial clusters if closest boundaries of the two or more regions are within a distance threshold;
    assigning each spatial cluster to a binary output plane;
    and eliminating regions from color or spatial clusters which are determined to be completely contained within other regions.

2. The method of claim 1, further comprising:
    sorting the spatial clusters according to their sizes.

3. The method of claim 1, further comprising:
    creating a background plane which contains one or more regions of the image data that are not included in any color cluster.

4. A method for organizing regions identified in image data, comprising:
    dividing an image area of the image data into a plurality of tiles;
    assigning one or more regions of the image data to a tile based on a location of a bounding box of each of the regions;
    forming one or more color clusters by including, in each color cluster, regions of the tile that have colors that differ by less than a color threshold, or
    grouping two or more regions included in a first color cluster into a spatial cluster, if closest boundaries of the two or more regions are within a distance threshold;
    creating a new color cluster for a first region within the tile if the first region is not included in any other color cluster;
    creating a new spatial cluster within the new color cluster if a closest boundary of a region of the new color cluster not included in an existing spatial cluster within the new color cluster is greater than a distance threshold away from a boundary of any other region of the existing spatial cluster within the new color cluster; and
    a) combining 2×2 blocks of tiles into new tiles;
    b)
        combining color clusters within a new tile if colors of regions of the color clusters within the new tile are less than the color threshold apart; and
        combining spatial clusters within the new tile if boundaries of regions of the spatial clusters within the new tile are less than the distance threshold apart;
    c) renaming the new tiles as tiles; and
    repeating a)-c) until a single tile includes all the regions of the image data.

5. The method of claim 4, further comprising:
    averaging colors of regions of a color cluster or a spatial cluster to generate an average color;
    assigning the average color as the color of the corresponding color or spatial cluster; and
    setting a size of the color or spatial cluster to a total number of pixels contained in the spatial cluster.

6. The method of claim 5, further comprising:
    selecting a spatial cluster;
    identifying regions of the selected spatial cluster which are completely contained within other regions; and
    eliminating the identified regions from the selected spatial cluster before generating the average color.

7. The method of claim 6, wherein identifying regions comprises:
    determining if a first region completely surrounds a second region on all sides; and
    determining for each pixel along a midline of a bounding box of the second region, at least one pixel belonging to the first region, and at least one subsequent adjacent pixel belonging to the second region.

8. An apparatus for processing regions of image data, comprising:
    a color cluster processor that forms one or more color clusters by grouping regions of the image data which are within a color threshold of each other, and/or a spatial cluster processor that forms one or more spatial clusters for each of the color clusters, regions of the color cluster being included in the spatial cluster when their respective bounding boxes are within a distance threshold of each other; and
    a planes generator which creates binary output planes based on the color or spatial clusters and an inner blob module which eliminates regions from color and/or spatial clusters which are determined to be completely contained within other regions;

wherein the color cluster processor also divides an image area of image data into a set of tiles, and assigns the regions of the image data to the tiles based on a location of a bounding box of each of the regions, and groups the regions into clusters depending on color and/or spatial characteristics of the regions.

9. The apparatus of claim 8, comprising a tile processor that:
   a) combines 2×2 blocks of tiles into a new tile;
   b) one or more of:
      1) combines the color clusters from the 2×2 blocks of tiles to form a new color cluster in the new tile if colors of regions of the color clusters in the tiles are within a color threshold of each other, and
      2) combines regions of each new color cluster having bounding boxes which are less than a distance threshold apart;
   c) renames the new tiles as old tiles;
   and repeats a)-c) until a single tile includes all regions in the image data.

10. The apparatus of claim 8, further comprising:
   a color averager that calculates an average color value of either a color cluster based on colors of regions included in the color cluster, or a spatial cluster based on colors of regions included in the spatial cluster, and calculates a size of the color or spatial cluster based on a total number of pixels of the regions included in the color or spatial cluster.

11. The apparatus of claim 8, wherein the inner blob module further eliminates color and/or spatial clusters which are not larger than a predefined threshold size.

12. The apparatus of claim 8, further comprising:
   a marking module which marks regions which do not conform to a set of predefined criteria.

13. The apparatus of claim 8, further comprising:
   a module which sorts the color and/or spatial clusters according to size.

14. A computer-readable medium having computer-readable program code embodied therein, the computer-readable program code performing the method of claim 1.

15. A xerographic marking device using the method of claim 1.

16. A digital photocopier using the method of claim 1.

* * * * *